(12) United States Patent
Ansinn et al.

(10) Patent No.: US 8,517,079 B2
(45) Date of Patent: Aug. 27, 2013

(54) SEALING APPARATUS

(75) Inventors: Detlev D. Ansinn, Bridgeman, MI (US); John Meisner, New Richmond, WI (US)

(73) Assignees: Bosch Packaging Technology, Inc., New Richmond, WI (US); Robert Bosch GmbH, Stuttgart (DE)

( * ) Notice: Subject to any disclaimer, the term of this patent is extended or adjusted under 35 U.S.C. 154(b) by 338 days.

(21) Appl. No.: 12/696,865

(22) Filed: Jan. 29, 2010

(65) Prior Publication Data

US 2011/0185681 A1    Aug. 4, 2011

(51) Int. Cl.
 *B30B 15/34*    (2006.01)
 *B32B 37/00*    (2006.01)
 *B29C 65/00*    (2006.01)

(52) U.S. Cl.
 USPC ............. 156/583.1; 156/358; 53/373.7

(58) Field of Classification Search
 USPC ............ 156/358, 580, 583.1; 53/469, 477, 53/479, 451, 452, 548, 553, 373.7, 374.8, 53/374.9, 573.9
 See application file for complete search history.

(56) References Cited

U.S. PATENT DOCUMENTS

| | | |
|---|---|---|
| 3,902,301 A | 9/1975 | Harkness et al. |
| 4,004,400 A | 1/1977 | Anderson et al. |
| 4,102,111 A | 7/1978 | Nack et al. |
| 4,219,988 A | 9/1980 | Shanklin et al. |
| 4,391,081 A | 7/1983 | Kovacs |
| 4,537,016 A | 8/1985 | Shanklin et al. |
| 5,014,496 A | 5/1991 | Davis et al. |
| 5,237,800 A | 8/1993 | Omori |
| 5,271,210 A | 12/1993 | Tolson |
| 5,347,795 A | 9/1994 | Fukuda |
| 5,566,531 A | 10/1996 | Nordstrom et al. |
| 5,584,166 A | 12/1996 | Lakey |
| 6,178,726 B1 | 1/2001 | Takigawa |
| 6,195,967 B1 | 3/2001 | Todd et al. |
| 6,876,107 B2 | 4/2005 | Jacobs |
| 2006/0144187 A1 | 7/2006 | Maeda |
| 2006/0218881 A1* | 10/2006 | Sperry et al. ................ 53/411 |

FOREIGN PATENT DOCUMENTS

| | | |
|---|---|---|
| DE | 196 27 892 A1 | 1/1998 |
| DE | 10 2005 010 203 A1 | 9/2006 |
| GB | 1189906 | 4/1970 |

OTHER PUBLICATIONS

International Search Report and Written Opinion mailed Apr. 5, 2011.
Fuji-Formost Alpha VI, *Formost Fuji Corporation*, 2 pages (Publicly known at least as early as 2008).
Fuji-Formost Alpha Wrapper, *Formost Fuji Corporation*, 2 pages (Publicly known at least as early as 2008).
Fuji-Formost FW-3401HS Wrapper, *Formost Fuji Corporation*, 1 page. (Publicly known at least as early as 2008).

* cited by examiner

*Primary Examiner* — John Goff
(74) *Attorney, Agent, or Firm* — Merchant & Gould P.C.

(57) ABSTRACT

A sealing apparatus for sealing a travelling packaging film. The sealing apparatus includes a first actuator, a second actuator, a first seal member, a second seal member, a slide rail arrangement, and a linkage coupled to the slide rail arrangement and connecting each of the first and second actuators to the first and second seal member. The first and second sealing members are actuated toward and away from each other between a disengaged position and an engaged position for sealing the travelling packaging film.

6 Claims, 19 Drawing Sheets

… (US 8,517,079 B2)

SEALING APPARATUS

BACKGROUND

Form and fill machines actuate a sealing mechanism through a motion profile to seal a travelling packaging film. The motion profile involves periodic engagement and disengagement of the sealing mechanism onto the film. This movement is abrupt and therein introduces instability into the system as a result of momentum associated with movement of the sealing mechanism and associated equipment coupled thereto.

SUMMARY

In one aspect, a sealing apparatus for sealing a travelling packaging film is disclosed. The sealing apparatus includes a first actuator, a second actuator, a first seal member, a second seal member, a slide rail arrangement, and a linkage coupled to the slide rail arrangement and connecting each of the first and second actuators to the first and second seal member. The first and second sealing members are actuated toward and away from each other between a disengaged position and an engaged position for sealing the travelling packaging film.

In another aspect, a method of sealing a travelling packaging film is disclosed. The method includes providing a first sealing bar and a second sealing bar each having opposite ends. The method further includes providing a first linkage and a second linkage each including a plurality of pivotally coupled linkage members forming a closed area. Each of the first linkage and the second linkage is mounted to each opposite end of the first and second sealing bars. The method still further includes providing a first linear slide and a second linear slide in parallel to the first linear slide. The method still further includes providing a first plurality of bearings slidably coupled to the first linear slide and pivotally coupled to the first linkage and a second plurality of bearings slidably coupled to the second linear slide and pivotally coupled to the second linkage. The method additionally includes actuating the first and second sealing bars in movement in an X-direction and a transverse Y-direction by adjusting a position of at least one of each of the first and second plurality of bearings along a longitudinal axis of the first and second linear slides, and sealing the travelling packaging film with the first and second sealing bars.

In another aspect, a sealing apparatus for sealing a film is disclosed. The sealing apparatus includes a first sealing bar and a second sealing bar each having opposite ends. The sealing apparatus further includes a first linkage and a second linkage each including a plurality of pivotally coupled linkage members. Each of the first linkage and second linkage has portions mounted to each opposite end of the first and second sealing bars. The sealing apparatus still further includes a first linear slide and a second linear slide in parallel to the first linear slide. The sealing apparatus still further includes a first plurality of bearings slidably coupled to the first linear slide and pivotally coupled to the first linkage and a second plurality of bearings slidably coupled to the second linear slide and pivotally coupled to the second linkage.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

DETAILED DESCRIPTION

Figure 1:
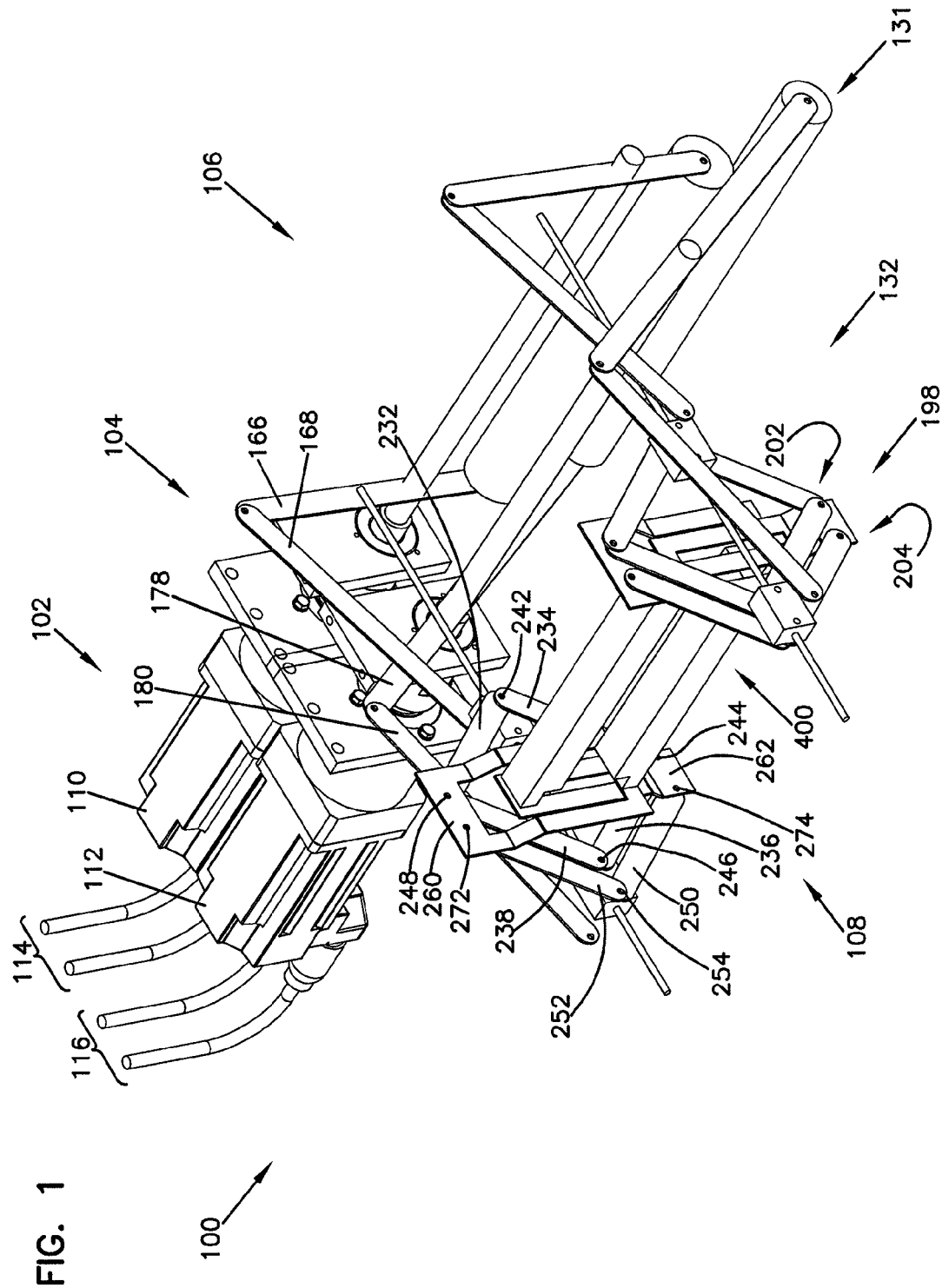
FIG. 1 is a partially exploded perspective view of an example sealing apparatus shown with sealing bars in a partially disengaged position.

The example embodiments described in the following disclosure are provided by way of illustration only and should not be construed as limiting. Various modifications and changes may be made to the example embodiments described below without departing from the true spirit and scope of the disclosure.

The present disclosure relates to a sealing apparatus configured to implement a dwell type sealing process on a travelling packaging film. Although not so limited, an appreciation of the various aspects of the disclosure will be gained through a discussion of the examples provided below.

Referring now to FIGS. 1-7, structural aspects of a first example sealing apparatus 100 are described according to the principles of the present disclosure. The example apparatus 100 includes an actuator module 102, an isolation module 104, a linkage module 106, and a sealing module 108.

The actuator module 102 includes a first servo 110 and a second servo 112. The first servo 110 includes a first servo output shaft 111. The second servo 112 includes a second servo output shaft 113. In one embodiment, the first and second servos 110, 112 are each an electro hydraulic servo motor. Still other embodiments are possible.

A first input 114 is coupled to the first servo 110 and a second input 116 is coupled to the second servo 112. A controller 115 is configured to independently transfer a control input to each of the first and second servos 110, 112 via the first and second inputs 114, 116. In example embodiments, the control input specifies an angular position of the respective servo output shafts 111, 113 which corresponds to a motion profile of the sealing module 108, as described in further detail below.

In one embodiment, the control input is specified by a user via a computing device 117 coupled to the controller 115. Parameters associated with the motion profile of the sealing module 108 are entered into custom software executing in the computing device 117. Example parameters include a sealing time, a sealing distance, a sealing pressure, and others.

The isolation module 104 is coupled to the actuator module 102. The isolation module 104 is configured to decouple mass associated with the actuator module 102 from the sealing module 108. The example isolation module 104 includes a first coupling 118, a second coupling 120, a first mounting 122, a second mounting 124, and a bracket 126.

The first coupling 118 is coupled to the first servo output shaft 111, which is positioned within a first rotary bracket bearing 128 of the bracket 126. Similarly, the second coupling 120 is coupled to the second servo output shaft 113, which is positioned within a second rotary bracket bearing 130 of the bracket 126. In example embodiments, the bracket 126 is rigidly coupled to a stationary surface (not shown) such that both the actuator module 102 and the isolation module 104 are fixed in position.

The linkage module 106 is coupled to the isolation module 104. The linkage module 106 is constructed from a plurality of pivotally coupled linkage members that are arranged to transform a change in angular position of the first and second servo output shafts 111, 113 into a linear motion of elements of the sealing module 108, as described further below.

Figure 2:
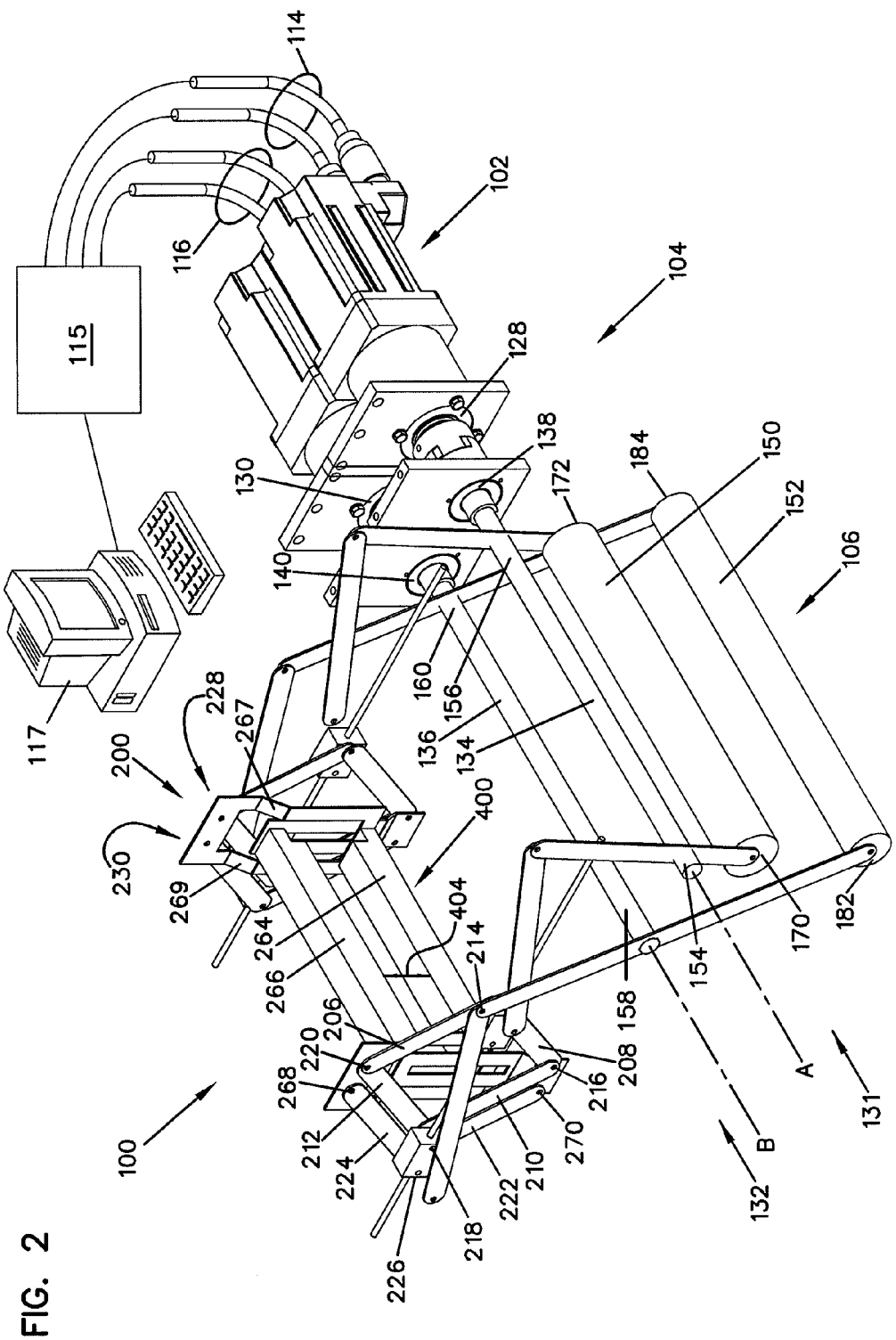
FIG. 2 is an alternate perspective view of the example sealing apparatus shown in FIG. 1.

The example linkage module 106 includes a primary linkage 131 coupled to a secondary linkage 132. The primary linkage 131 includes a first crankshaft 134 and a second crankshaft 136. The first crankshaft 134 is positioned within a first rotary mounting bearing 138 of the first mounting 122 and therein coupled to the first coupling 118. The second crankshaft 136 is positioned within a second rotary mounting bearing 140 of the second mounting 124 and therein coupled to the second coupling 120. In this manner, the first servo output shaft 111, the first coupling 118, and the first crankshaft 134 are coupled together aligned along an axis A as shown in FIG. 2. Similarly, the second servo output shaft 113, the second coupling 120, and the second crankshaft 136 are coupled together aligned along an axis B in parallel to the axis A.

The primary linkage 131 further includes a first distal linkage 142, a first proximal linkage 144, a second distal linkage 146, a second proximal linkage 148, a first counterbalance 150, and a second counterbalance 152.

In the example shown, the first distal linkage 142 includes a first distal crank link 162 pivotally coupled to a first distal follower link 164. The first distal crank link 162 and the first distal follower link 164 are each a bar-shaped linkage member. The first distal crank link 162 is rigidly coupled to a first distal end portion 154 of the first crankshaft 134. The first distal follower link 164 is coupled to the secondary linkage 132, as described further below.

The second distal linkage 146 of the primary linkage 131 is symmetrically configured with respect to the first distal linkage 142. For example, the second distal linkage 146 includes a second distal crank link 174 pivotally coupled to a second distal follower link 176. The second distal crank link 174 and the second distal follower link 176 are each a bar-shaped linkage member. The second distal crank link 174 is rigidly coupled to second distal end portion 158 of the second crankshaft 136. The second distal follower link 176 is coupled to the secondary linkage 132, as described further below.

The first proximal linkage 144 of the primary linkage 131 includes a first proximal crank link 166 pivotally coupled to a first proximal follower link 168. The first proximal crank link 166 and the first proximal follower link 168 are each a bar-shaped linkage. The first proximal crank link 166 is rigidly coupled to a first proximal end portion 156 of the first crankshaft 134. The first proximal follower link 168 is coupled to the secondary linkage 132, as described further below.

The second proximal linkage 148 is symmetrically configured with respect to the first proximal linkage 144. For example, the second proximal linkage 148 includes a second proximal crank link 178 pivotally coupled to a second proximal follower link 180. The second proximal crank link 178 and the second proximal follower link 180 are each a bar-shaped linkage member. The second proximal crank link 178 is rigidly coupled to second proximal end portion 160 of second crankshaft 136. In general, the second proximal follower link 180 is coupled to the secondary linkage 132, as described further below.

In example embodiments, the first counterbalance 150 is a weighted member having a first counterbalance distal portion 170 coupled to the first distal crank link 162 and a first counterbalance proximal portion 172 coupled to the first proximal crank link 166. Similarly, the second counterbalance 152 is a weighted member having a second counterbalance distal portion 182 coupled to the second distal crank link 174 and a second counterbalance proximal portion 184 coupled to the second proximal crank link 178.

The first and second counterbalances 150, 152 are coupled to the primary linkage 131 to minimize vibration of the example apparatus 100 during implementation of a dwell type sealing process on a travelling packaging film.

For example, in one embodiment, the first and second counterbalances 150, 152 minimize vibration of the example apparatus 100 when operated at approximately 0-80 dwell type sealing operations per minute. In other embodiments, the first and second counterbalances 150, 152 minimize vibration of the example apparatus 100 when operated at approximately 80-120 dwell type sealing operations per minute. In further embodiments, the first and second counterbalances 150, 152 minimize vibration of the example apparatus 100 when operated at approximately 120-160 dwell type sealing operations per minute.

As mentioned above, the secondary linkage 132 of the example linkage module 106 is coupled to the primary linkage 131. The example secondary linkage 132 includes a first distal bearing 186, a first proximal bearing 188, a second distal bearing 190, a second proximal bearing 192, a distal rail 194, a proximal rail 196, a distal bar linkage 198, and a proximal bar linkage 200.

In the example shown, the first distal follower link 164 of the first distal linkage 142 is pivotally coupled to the first distal bearing 186. The second distal follower link 176 of the second distal linkage 146 is pivotally coupled to the second distal bearing 190. The first proximal follower link 168 of the first proximal linkage 144 is pivotally coupled to the first proximal bearing 188. Further, the second proximal follower link 180 of the second proximal linkage 148 is pivotally coupled to the second proximal bearing 192.

Figure 4:
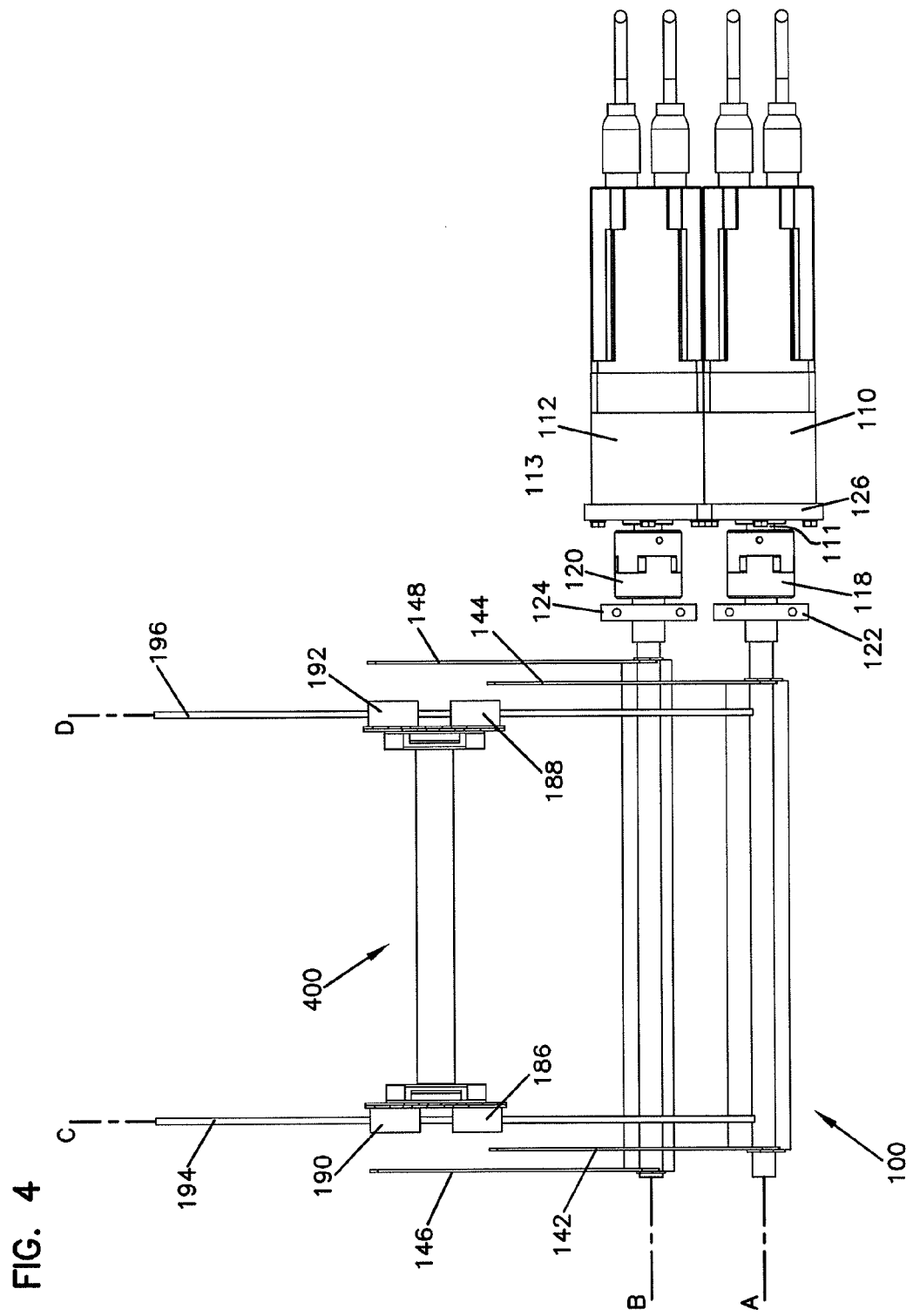
FIG. 4 is a top view of the example sealing apparatus shown in FIG. 1.

The first distal bearing 186 and the second distal bearing 190 are each slidably coupled to the distal rail 194. Similarly, the first proximal bearing 188 and the second proximal bearing 192 are each slidably coupled to the proximal rail 196. The distal rail 194 is aligned along an axis C in parallel to the proximal rail 196 which is aligned along an axis D, as shown in FIG. 4. The axis C and D are perpendicular to the axis A and B described above.

As mentioned above, the example secondary linkage 132 includes a distal bar linkage 198. The distal bar linkage 198 includes a distal closed linkage 202 adjacent to a distal open linkage 204. The distal closed linkage 202 is constructed from four bar-shaped linkage members including a first distal closed link 206, a second distal closed link 208, a third distal closed link 210, and a fourth distal closed link 212. In general, the first distal closed link 206, second distal closed link 208, third distal closed link 210, and fourth distal closed link 212 are pivotally connected to form a closed area.

For example, the first distal closed link 206 and the second distal closed link 208 are pivotally coupled at a first distal pivot point 214. The first distal pivot point 214 corresponds to the pivot point that the first distal follower link 164 of the first distal linkage 142 is coupled to the first distal bearing 186, as described above. The second distal closed link 208 and the third distal closed link 210 are pivotally coupled at a second distal pivot point 216. The third distal closed link 210 and the fourth distal closed link 212 are pivotally coupled at a third distal pivot point 218. The first distal closed link 206 and the fourth distal closed link 212 are pivotally coupled at a fourth distal pivot point 220.

The distal open linkage 204 is constructed from two bar-shaped linkage members including a first distal open link 222 and a second distal open link 224. The first distal open link 222 and the second distal open link 224 are pivotally coupled at a fifth distal pivot point 226 adjacent to the third distal pivot point 218 of the distal closed linkage 202. The fifth distal pivot point 226 corresponds to the pivot point that the second distal follower link 176 of the second distal linkage 246 is pivotally coupled to the second distal bearing 190, as described above.

The proximal bar linkage 200 of the secondary linkage 132 is symmetrically configured with respect to the distal bar linkage 198. For example, the proximal bar linkage 200 includes a proximal closed linkage 228 adjacent to a proximal open linkage 230. The proximal closed linkage 228 is formed from four bar-shaped linkage members including a first proximal closed link 232, a second proximal closed link 234, a third proximal closed link 236, and a fourth proximal closed link 238. The first proximal closed link 232, second proximal closed link 234, third proximal closed link 236, and fourth proximal closed link 238 are pivotally coupled to form a closed area.

The first proximal closed link 232 and the second proximal closed link 234 are pivotally coupled at a first proximal pivot point 242. The first proximal pivot point 242 corresponds to the pivot point that the first proximal follower link 168 of the first proximal linkage 144 is coupled to first proximal bearing 188, as described above. The second proximal closed link 234 and the third proximal closed link 236 are pivotally coupled at a second proximal pivot point 244. The third proximal closed link 236 and the fourth proximal closed link 238 are pivotally coupled at a third proximal pivot point 246. The first proximal closed link 232 and the fourth proximal closed link 238 are pivotally coupled at a fourth proximal pivot point 248.

The proximal open linkage 230 is constructed from two bar-shaped linkage members including a first proximal open link 250 and a second proximal open link 252. The first proximal open link 250 and the second proximal open link 252 are pivotally coupled at a fifth proximal pivot point 254 that is adjacent to the third proximal pivot point 246 of the proximal closed linkage 228. The fifth proximal pivot point 254 corresponds to the pivot point that second proximal follower link 180 of second proximal linkage 148 is coupled to second proximal bearing 192, as described above.

As mentioned above, the example apparatus 100 additionally includes a sealing module 108. The sealing module 108 is coupled to the linkage module 106. The sealing module 108 is configured to seal a travelling packaging film in accordance with a motion profile, described in further detail below.

The example sealing module 108 includes a first distal sealing bar mount 256, a second distal sealing bar mount 258, a first proximal sealing bar mount 260, a second proximal sealing bar mount 262, a first sealing bar 264, and a second sealing bar 266.

The first distal sealing bar mount 256 is coupled to the distal bar linkage 198 at the fourth distal pivot point 220 of the distal closed linkage 202, and at a sixth distal pivot point 268 of the distal open linkage 204. The second distal sealing bar mount 258 is coupled to the distal bar linkage 198 at the second distal pivot point 216 of the distal closed linkage 202, and at a seventh proximal pivot point 270 of the distal open linkage 204.

The first and second proximal sealing bar mounts 260, 262 are symmetrically configured with respect to the first and second distal sealing bar mounts 256, 258. For example, the first proximal sealing bar mount 260 is coupled to the proximal bar linkage 200 at the fourth proximal pivot point 248 of the proximal closed linkage 228, and at a sixth proximal pivot point 272 of the proximal open linkage 230.

The second proximal sealing bar mount 262 is coupled to the proximal bar linkage 200 at the second proximal pivot point 244 of the proximal closed linkage 228, and at a seventh proximal pivot point 274 of the proximal open linkage 230.

In example embodiments, the first distal sealing bar mount 256 and the first proximal sealing bar mount 260 are each constructed to include a first flexible bend 267 and a second flexible bend 269. Similarly, the second distal sealing bar mount 258, and the second proximal sealing bar mount 262 are each constructed to include a flexible bend 271. In this manner, each respective mount 256, 258, 260, 262 are constructed to include a force compliance mechanism that equally distributes a sealing pressure imparted on a travelling packaging film during a dwell type sealing process.

As mentioned above, the sealing module 108 additionally includes a first sealing bar 264 and a second sealing bar 266. In example embodiments, the first sealing bar 264 includes a first sealing bar distal end 276 and a first sealing bar proximal end 278. The first sealing bar distal end 276 is coupled to a first distal sealing bar end portion 284 of the first distal sealing bar mount 256, and the first sealing bar proximal end 278 is coupled to a first proximal sealing bar end portion 286 of the first proximal sealing bar mount 260. In this manner, the first sealing bar 264 is coupled between the first distal sealing bar mount 256 and the first proximal sealing bar mount 260.

Similarly, second sealing bar 266 includes a second sealing bar distal end 280 and a second sealing bar proximal end 282. The second sealing bar distal end 280 of the second sealing bar 266 is coupled to a second distal sealing bar end portion 288 of the second distal sealing bar mount 258, and the second sealing bar proximal end 282 of the second sealing bar 266 is coupled to a second proximal sealing bar end portion 290 of the second proximal sealing bar mount 262. As such, the second sealing bar 266 is coupled between second distal sealing bar mount 258 and second proximal sealing bar mount 262.

In general, any of a plurality of materials and methods of manufacture may be used to form linkage members of example apparatus 100. Example materials include aluminum, sheet metal, and others. Examples methods of manufacture includes stamping, laser cutting, casting, and others.

Operational aspects of the example apparatus 100 are now described according to the principles of the present disclosure.

Operation of the example apparatus 100 comprises mapping a change in an angular position of the first and second crankshafts 134, 136 to a linear motion of the first and second distal bearings 186, 190 along the distal rail 194, and a symmetric linear motion of the first and second proximal bearings 188, 192 along the proximal rail 196. The motion of the respective bearings 186, 190 and 188, 192 in turn correspond to a motion profile of the sealing module 108 comprising vertical and lateral displacement of the first and second sealing bars 264, 266 during a dwell type sealing operation.

With the configuration of the linkage module 106 and sealing module 108 as described above, the motion of the first and second distal bearings 186, 190 is symmetric with respect to the first and second proximal bearings 188, 192 during operation of the example apparatus 100. Accordingly, the vertical and lateral displacement of the first and second sealing bars 264, 266 during a dwell type sealing operation are now described in terms of motion of the first and second distal bearings 186, 190 along the distal rail 194.

In example embodiments, adjustment of a relative distance between the first and second distal bearings 186, 190 on the distal rail 194 is used to control a vertical separation of the first and second sealing bars 264, 266 throughout a dwell type sealing operation. As described in further detail below, a dwell type sealing operation generally includes engaging the first and second sealing bars 264, 266 to a travelling packing film at a start position, maintaining engagement of the first and second sealing bars 264, 266 over a sealing distance to achieve a seal, and returning the first and second sealing bars 264, 266 to the start position.

Figure 3:
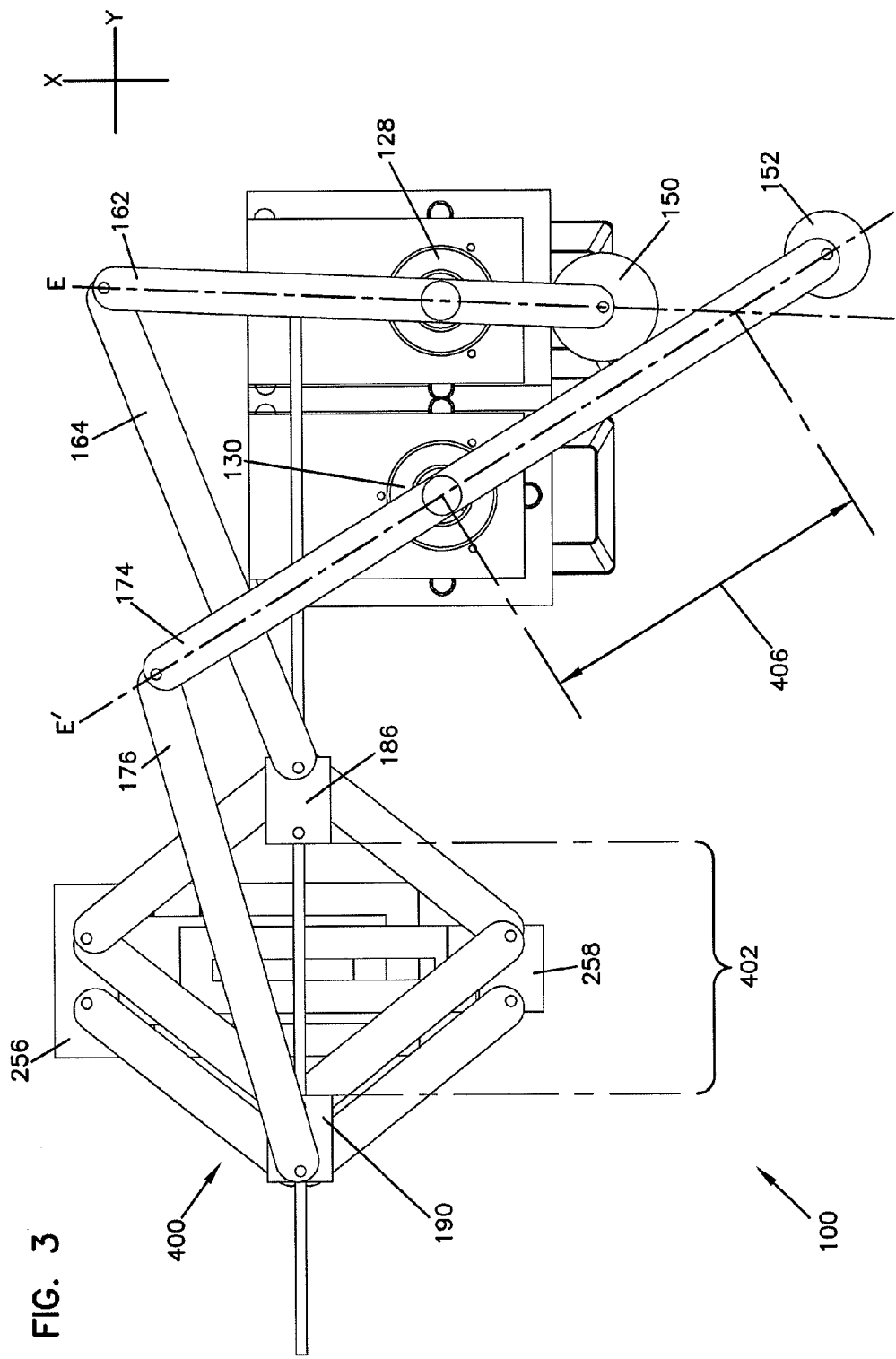
FIG. 3 is a side view of the example sealing apparatus shown in FIG. 1.

Referring now to FIGS. 1-3, the first and second sealing bars 264, 266 are shown in a partial disengaged position 400. In the example shown, the angular position of the first and second crankshafts 134, 136 are independently adjusted such that the first and second distal bearings 186, 190 are actuated to a distance 402 relative to one another. In the example embodiment, distance 402 corresponds to a vertical separation 404 between the first and second sealing bars 264, 266.

In the partial disengaged position 400, an axis E aligned along the first distal crank link 162 and an axis E' aligned along the second distal crank link 174 intersect at a distance 406 along second distal crank link 174 with respect to the second crankshaft 136.

Figure 5:
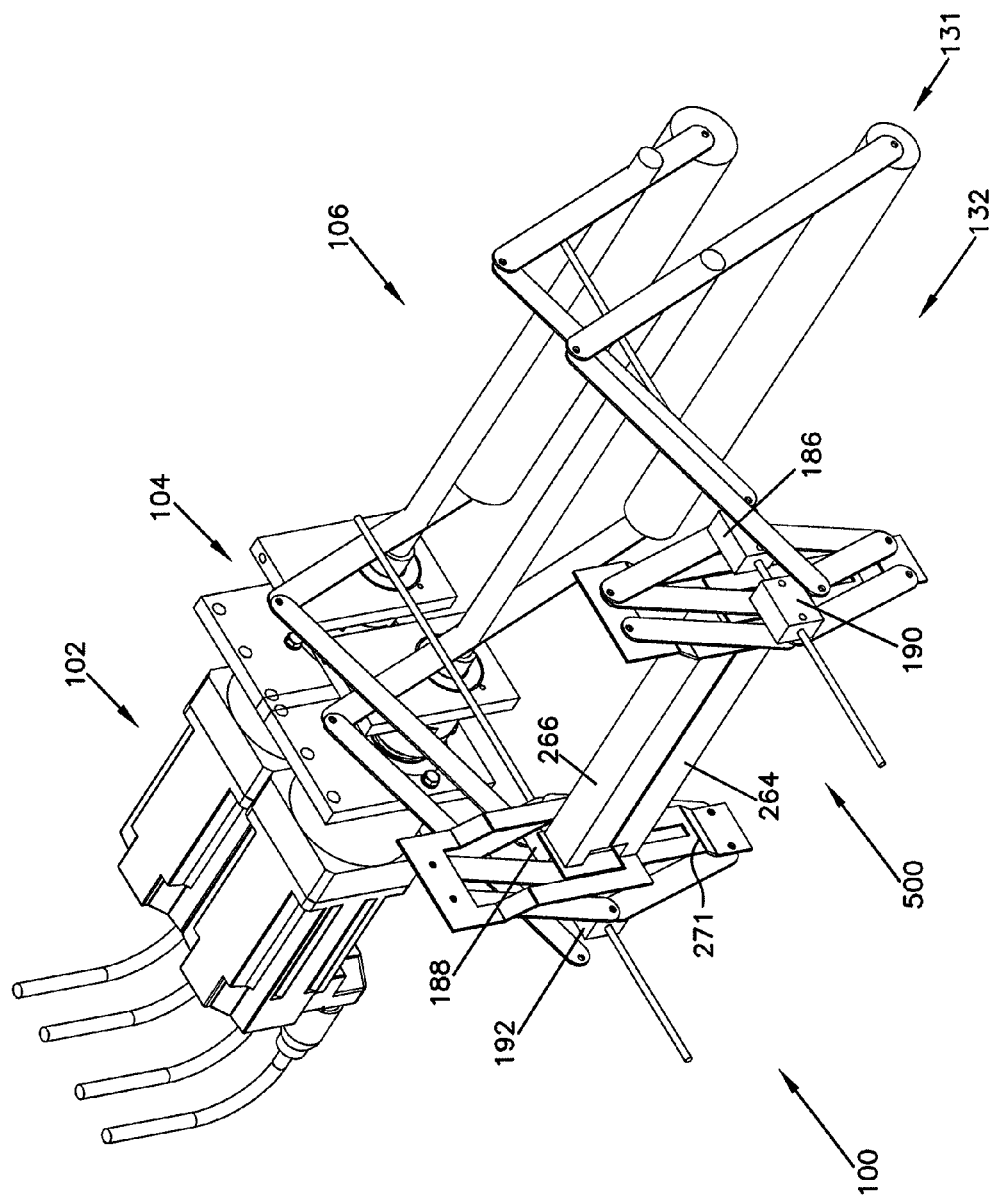
FIG. 5 is a partially exploded perspective view of the example sealing apparatus of FIG. 1 shown with sealing bars shown in an engaged position.
Figure 6:
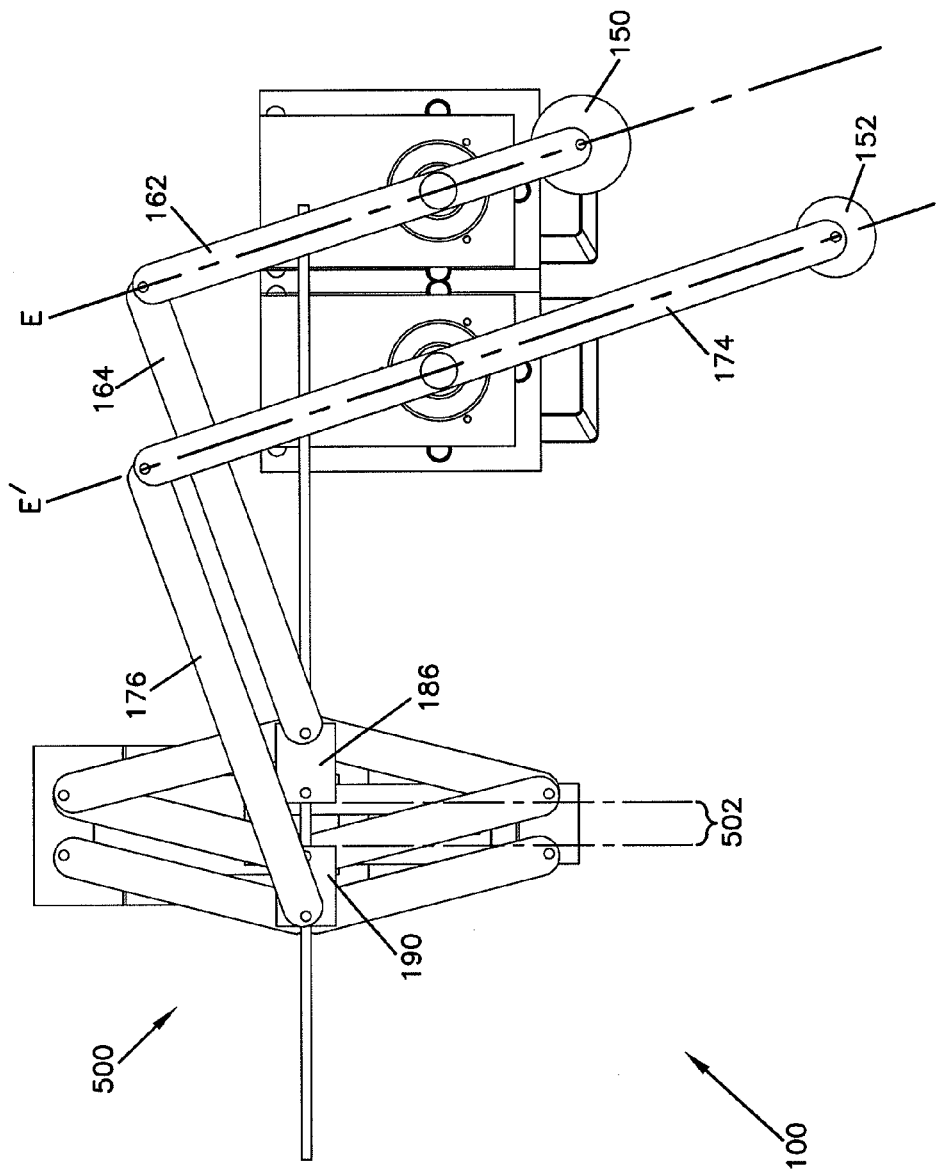
FIG. 6 is a side view of the example sealing apparatus shown in FIG. 5.

Referring now to FIGS. 5 and 6, the first and second sealing bars 264, 266 are shown in an engaged position 500. In the example shown, the angular position of the first and second crankshafts 134, 136 are independently adjusted such that the first and second distal bearings 186, 190 are actuated to a distance 502 relative to one another. In the example embodiment, the first and second sealing bars 264, 266 are in contact with each other.

In the engaged position 500, the axis E aligned along the first distal crank link 162 and the axis E' aligned along the second distal crank link 174 are approximately in parallel and thus do not intersect along second distal crank link 174. In example embodiments, a torque required of the first and second crankshafts 134, 136 to actuate the first distal crank link 162 and the second distal crank link 174 to align in parallel is approximately equal. Accordingly, a force imparted on the first distal bearing 186 by the first distal follower link 164 is approximately equal to a force imparted on the second distal bearing 190 by the second distal follower link 176. In turn, a force imparted on a packaging film by the first sealing bar 264 is approximately equal to a force imparted on a packaging film by the second sealing bar 266 when the first and second sealing bars 264, 266 are positioned in the engaged position 500 during a dwell type sealing process.

Figure 7:
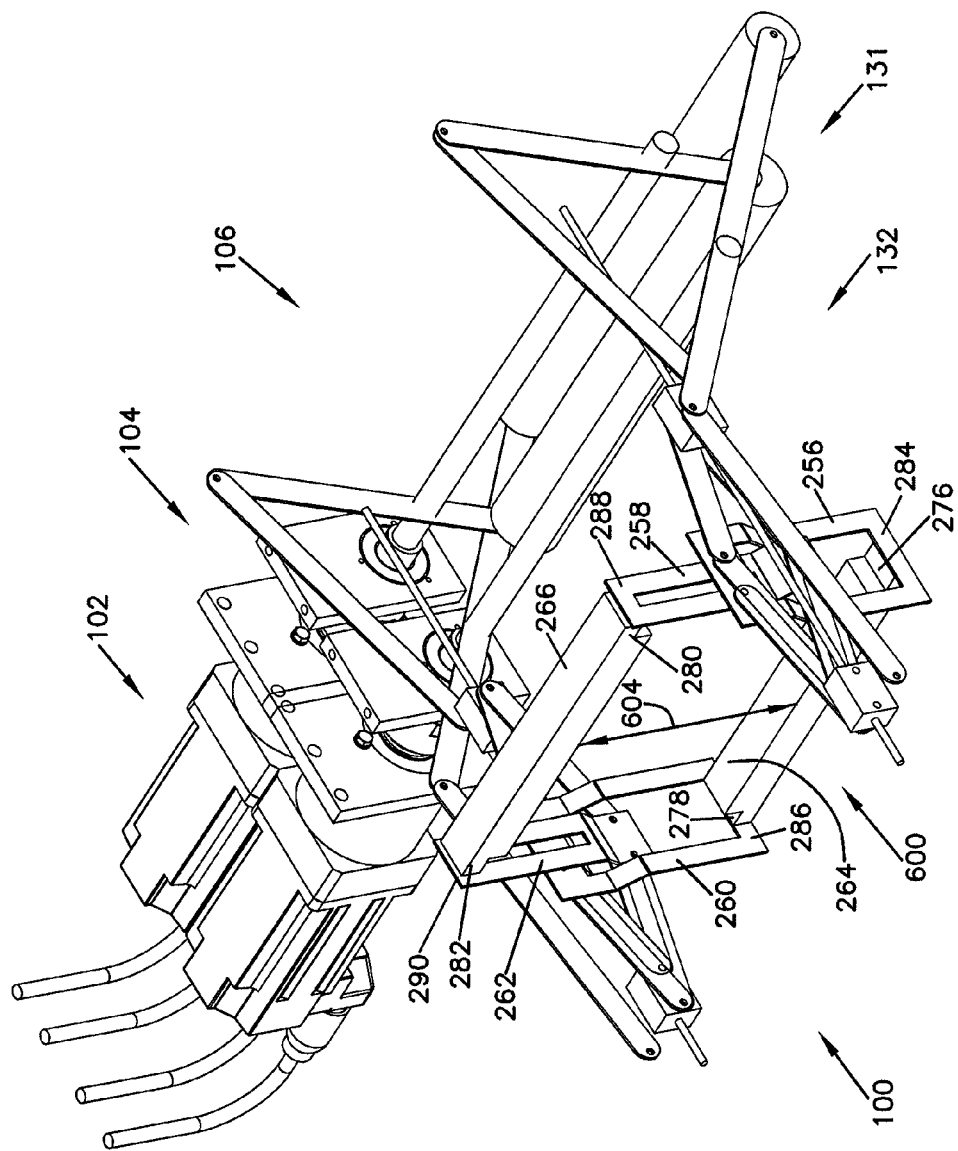
FIG. 7 is a partially exploded perspective view of the example sealing apparatus of FIG. 1 shown with sealing bars in a fully disengaged position.
Figure 8:
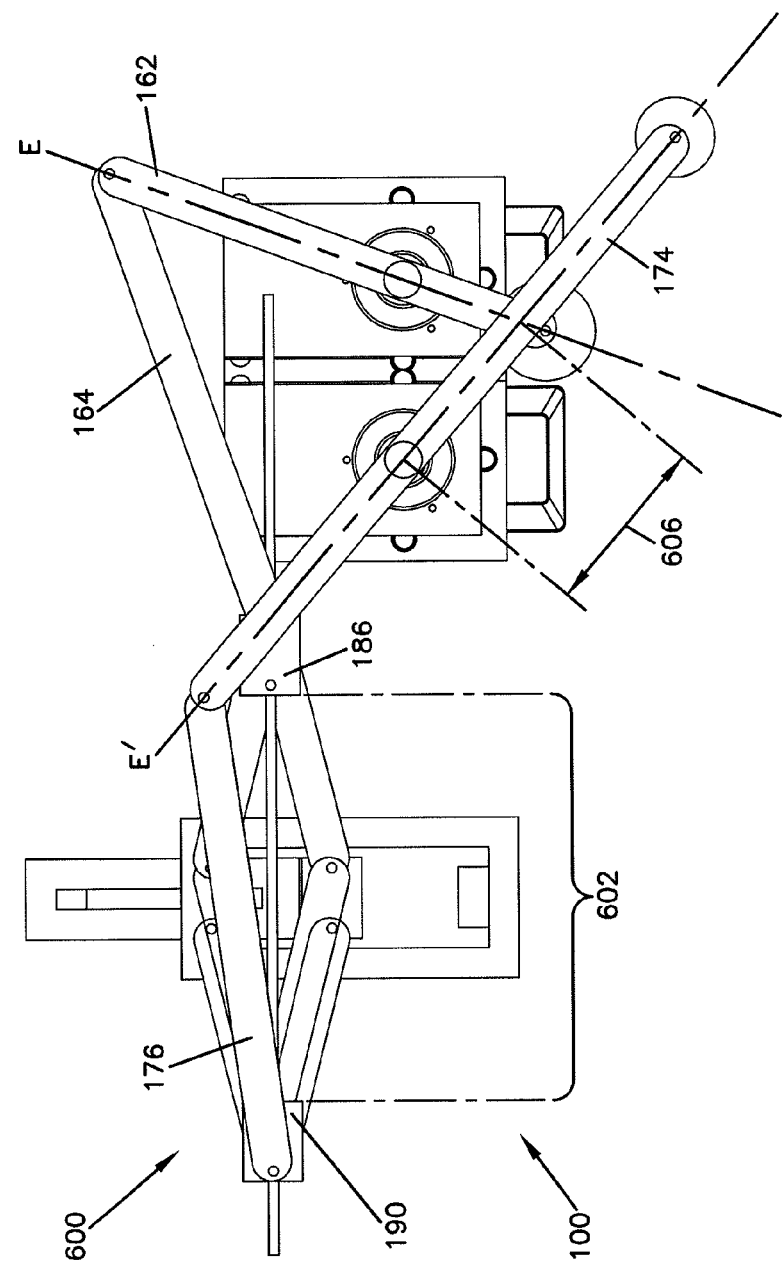
FIG. 8 is a side view of the example sealing apparatus shown in FIG. 7.

Referring now to FIGS. 7 and 8, the first and second sealing bars 264, 266 are shown in a fully disengaged position 600. In the example shown, the angular position of the first and second crankshafts 134, 136 are independently adjusted such that the first and second distal bearings 186, 190 are actuated to a distance 602 relative to one another. In the example embodiment, distance 602 corresponds to a vertical separation 604 between the first and second sealing bars 264, 266.

In the fully disengaged position 600, an axis E aligned along the first distal crank link 162 and an axis E' aligned along the second distal crank link 174 intersect at a distance 606 along second distal crank link 174 with respect to the second crankshaft 136. In this position, axis E' and axis E are approximately perpendicular and thus the distance 606 is less than the distance 406 as described above with respect to the partial disengaged position 400.

In general, the relative distance between the first and second distal bearings 186, 190 on the distal rail 194 is an adjustable parameter that may be defined throughout a dwell type sealing operation. Other example adjustable parameters include a dwell time, a dwell pressure, a sealing temperature, and other dwell type sealing process parameters.

In example embodiments, adjustment of absolute position of the first and second distal bearings 186, 190 along the distal rail 194 while maintaining a relative distance therebetween is used to control a lateral displacement of the first and second sealing bars 264, 266 throughout a dwell type sealing operation. As briefly mentioned above, a dwell type sealing operation generally comprises engaging the first and second sealing bars 264, 266 to a travelling packing film at a start position, maintaining engagement of the first and second sealing bars 264, 266 over a predefined distance to achieve a seal, and returning the first and second sealing bars 264, 266 to the start position.

Figure 9:
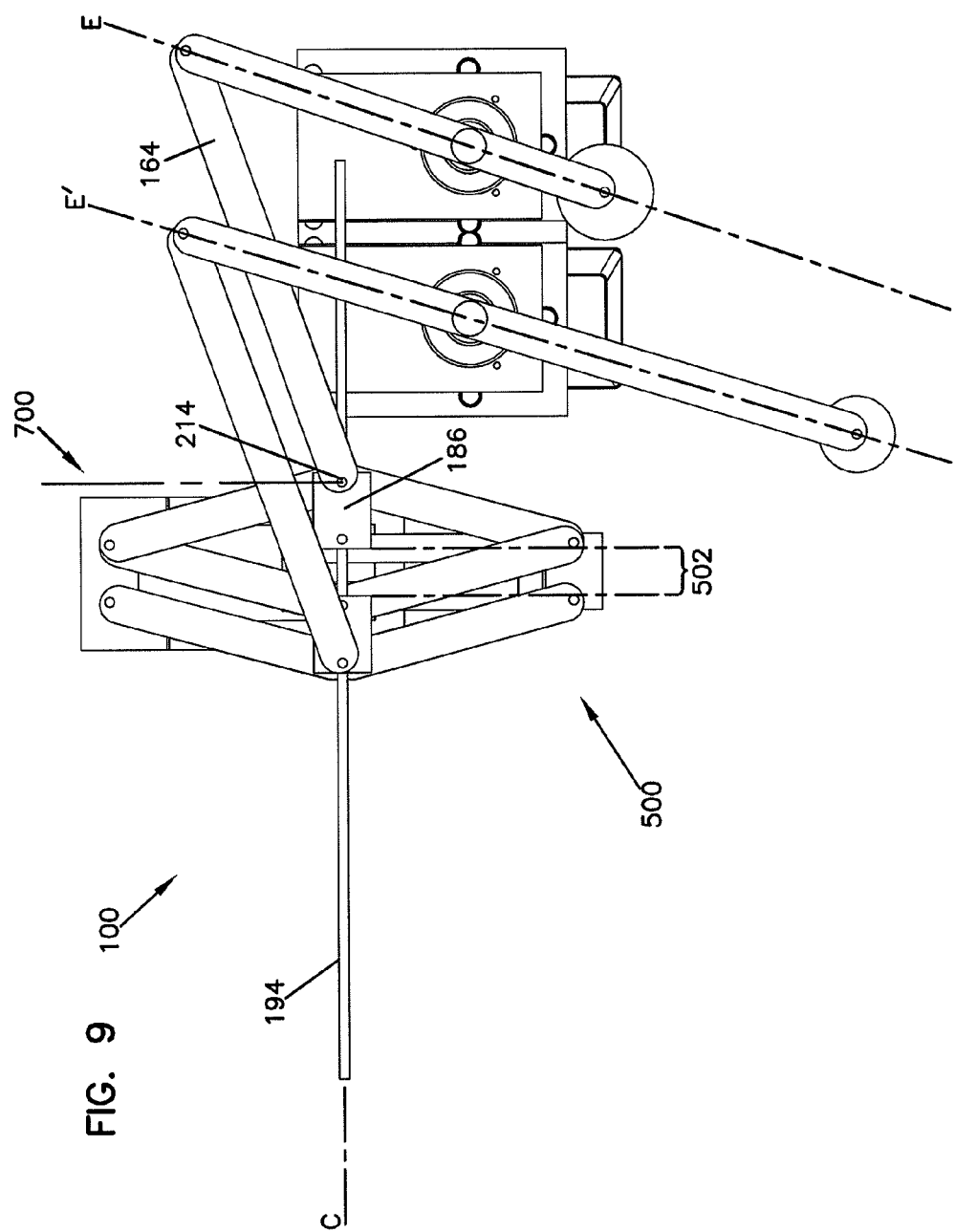
FIG. 9 is a side view of the example sealing apparatus shown in FIG. 5 with sealing bars positioned at a start of a sealing distance of a sealing process.

For example, referring now to FIG. 9, the first and second sealing bars 264, 266 are shown at a start position 700 of a dwell type sealing operation. In this position, the angular position of the first and second crankshafts 134, 136 are independently adjusted such that first and second sealing bars 264, 266 are actuated to the engaged position 500. In the example embodiment, the start position 700 is defined with respect to an initial position of the first distal pivot point 214 along the distal rail 194.

Figure 10:
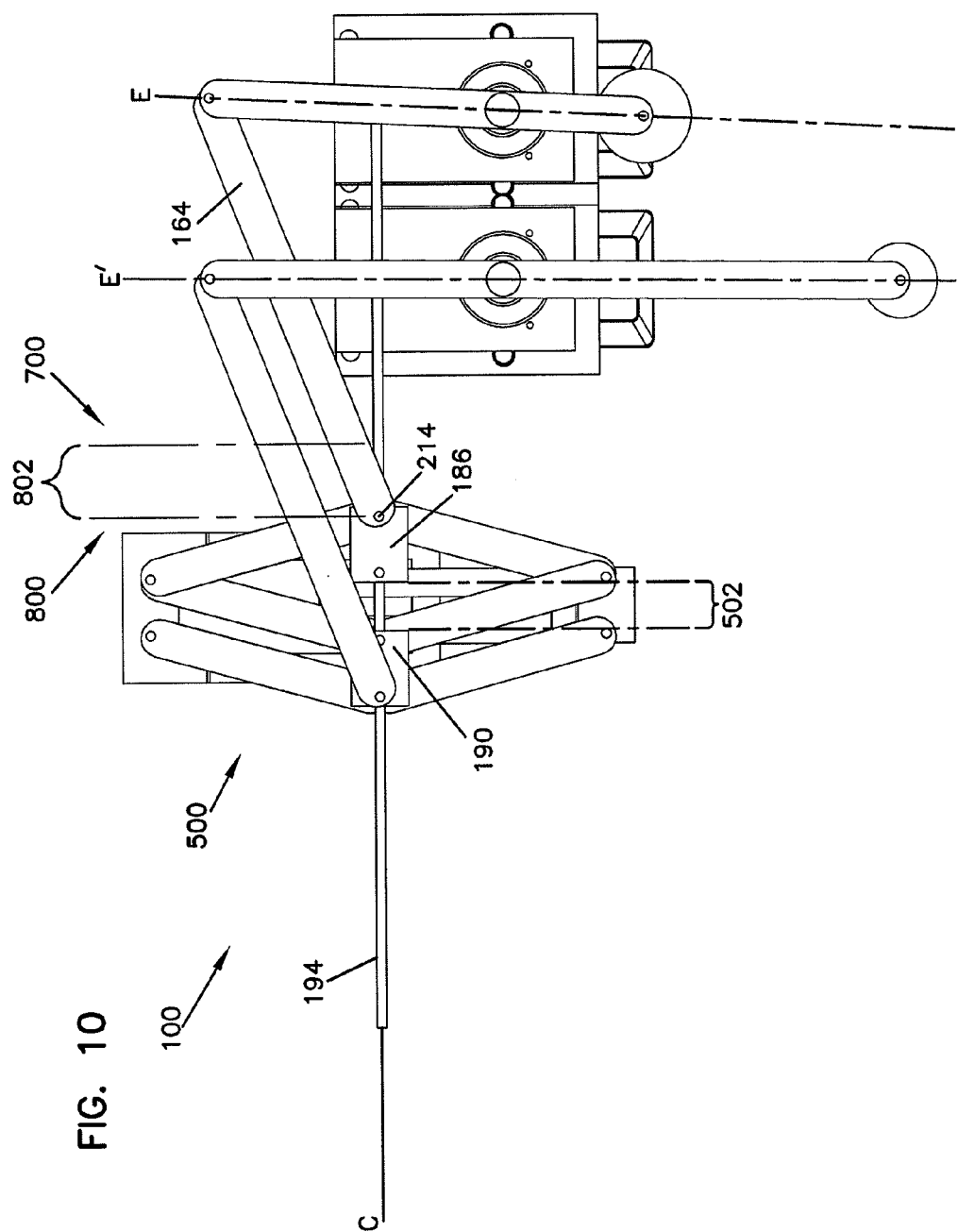
FIG. 10 is a side view of the example sealing apparatus shown in FIG. 5 with sealing bars horizontally displaced to an intermediate distance of a sealing process.

Referring now to FIG. 10, the first and second sealing bars 264, 266 are shown at an intermediate position 800 of the dwell type sealing operation. In the example embodiment, the intermediate position 800 is defined with respect to an intermediate position of the first distal pivot point 214 along the distal rail 194. In the example shown, the first and second sealing bars 264, 266 are displaced laterally a distance 802 along the distal rail 194 while maintaining the engaged position 500. This is accomplished via coordinated adjustment of the angular position of the first and second crankshafts 134, 136 such that the first and second sealing bars 264, 266 are displaced while maintaining the first and second distal bearings 186, 190 to the distance 502 relative to one another.

Figure 11:
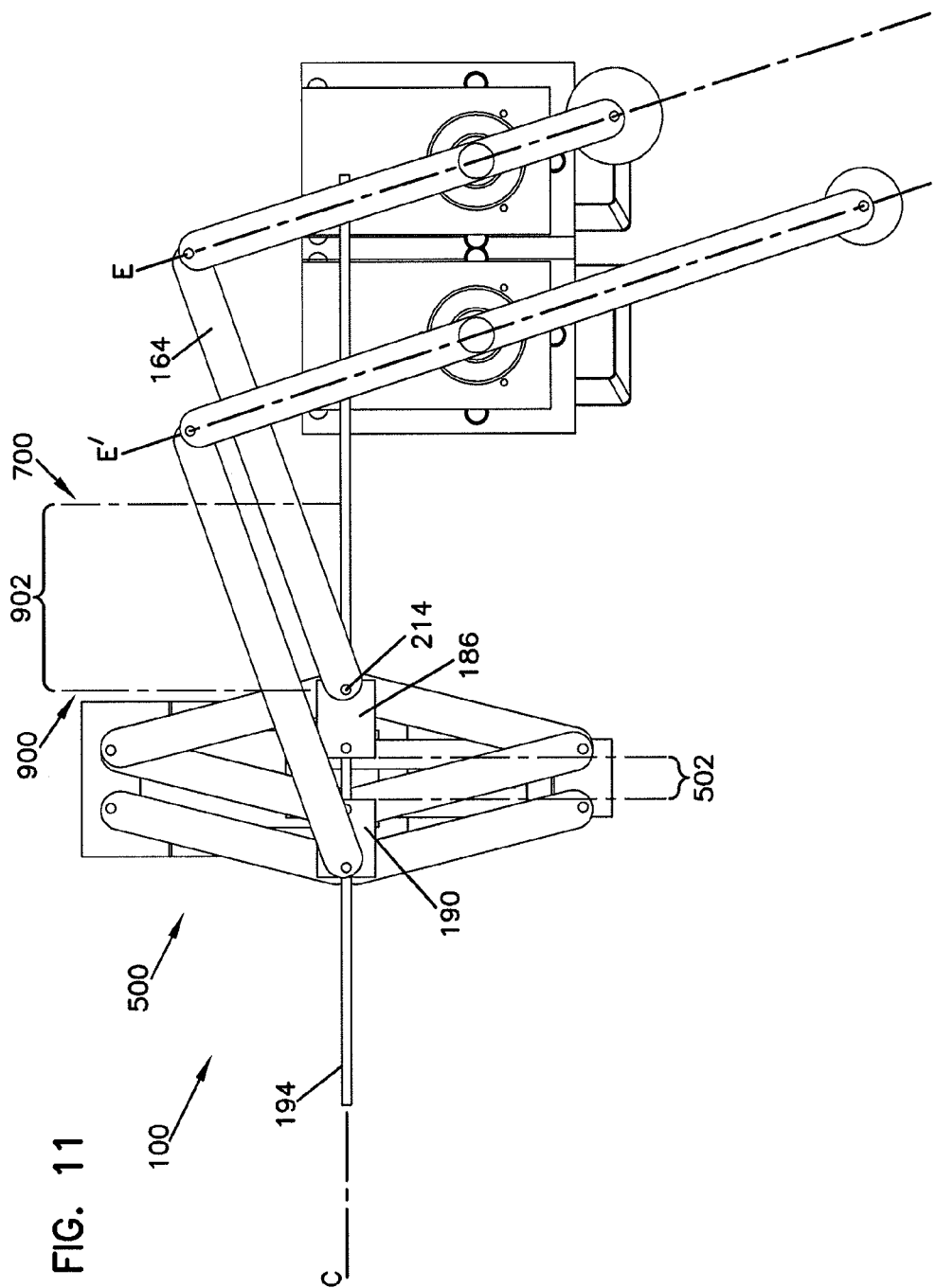
FIG. 11 is a side view of the example sealing apparatus shown in FIG. 5 with sealing bars horizontally displaced to an end of a sealing distance of a sealing process.

Referring now to FIG. 11, the first and second sealing bars 264, 266 are shown in an end position 900. In the example embodiment, the end position 900 is defined with respect to an end position of the first distal pivot point 214 along the distal rail 194. In the example shown, the first and second sealing bars 264, 266 are displaced horizontally a distance 902 while maintaining the engaged position 500. At the end position 900, the angular position of the first and second crankshafts 134, 136 are independently adjusted such that the first and second sealing bars 264,266 are actuated to the fully disengaged position 600 and returned to the start position 700 via coordinated adjustment.

Referring now to FIGS. 12-19, structural aspects of a second example sealing apparatus 1200 are described according to the principles of the present disclosure. The example apparatus 1200 includes an actuator module 1202 and a sealing module 1204.

The actuator module 1202 includes a first motor system 1206 and a second motor system 1208. The first and second motor systems 1206, 1208 are similarly configured and each include a linear motor such as, for example, a flat linear motor, a U-channel linear motor, a tubular linear motor, and others.

In the example shown, the first and second motor systems 1206, 1208 include a first linear actuator 1210 and a second linear actuator 1212 each slidably coupled to a shaft assembly 1214. The first and second linear actuators 1210, 1212 each include a coil 1216 coupled to a bearing 1218. The shaft assembly 1214 includes a first guide shaft 1220, a second guide shaft 1222, and a magnetized slide shaft 1224. The shaft assembly 1214 of the first motor system 1206 is aligned along an axis F. The shaft assembly 1214 of the second motor system 1208 is aligned along an axis G in parallel to the axis F.

As indicated above, the first and second linear actuators 1210, 1212 of the first and second motor systems 1206, 1208 are each slidably coupled to a respective shaft assembly 1214. In example embodiments, the first guide shaft 1220, second guide shaft 1222, and magnetized slide shaft 1224 are positioned within a respective linear bearing 1225, 1227, 1229 formed within each bearing 1218. The magnetized slide shaft 1224 is further positioned within the coil 1216 coupled to each respective bearing 1218.

An input 1226 is coupled to the coil 1216 of each respective bearing 1218. A controller 1228 is configured to independently transfer a control input to the coil 1216 of each respective bearing 1218 via the input 1226. In example embodiments, the control input specifies a position of the first and second linear actuators 1210, 1212 of each of the first and second motor systems 1206, 1208 along the respective shaft assembly 1214, described further below.

In one embodiment, the control input is specified by a user via a computing device 1230 coupled to the controller 1228. Parameters associated with the motion profile of the sealing module 1204 are entered into custom software executing in the computing device 1230. Example parameters include a sealing time, a sealing distance, a sealing pressure, and others.

The coil 1216 of each respective bearing 1218 is configured to transfer feedback information to the controller 1228 via the input 1226. In example embodiments, the feedback specifies an actual position of the first and second linear actuators 1210, 1212 of each of the first and second motor systems 1206, 1208 along the respective shaft assembly 1214, as described further below.

As mentioned above, the example apparatus 1200 additionally includes a sealing module 1204. The sealing module 1204 is coupled to the actuator module 1202. In general, the sealing module 1204 is configured similarly to the sealing module 108 and the secondary linkage 132 of the example apparatus 100 as described above.

For example, the sealing module 1204 includes a distal bar linkage 1232 and a proximal bar linkage 1234. The distal bar linkage 1232 includes a distal closed linkage 1236 adjacent to a distal open linkage 1238. The distal closed linkage 1236 is constructed from four bar-shaped linkage members including a first distal closed link 1240, a second distal closed link 1242, a third distal closed link 1244, and a fourth distal closed link 1246. In general, the first distal closed link 1240, second distal closed link 1242, third distal closed link 1244, and fourth distal closed link 1246 are pivotally connected to form a closed area.

For example, the first distal closed link 1240 and the second distal closed link 1242 are pivotally coupled at a first distal pivot point 1248. The first distal pivot point 1248 corresponds to a pivot point that the bearing 1218 of the second linear actuator 1212 of the first motor system 1206 is coupled to the sealing module 1204. The second distal closed link 1242 and the third distal closed link 1244 are pivotally coupled at a second distal pivot point 1250. The third distal closed link 1244 and the fourth distal closed link 1246 are pivotally coupled at a third distal pivot point 1252. The third distal pivot point 1252 corresponds to a first pivot point that the bearing 1218 of the first linear actuator 1210 of the first motor system 1206 is coupled to the sealing module 1204. The first distal closed link 1240 and the fourth distal closed link 1246 are pivotally coupled at a fourth distal pivot point 1254.

The distal open linkage 1238 is constructed from two bar-shaped linkage members including a first distal open link 1256 and a second distal open link 1258. The first distal open link 1256 and the second distal open link 1284 are pivotally coupled at a fifth distal pivot point 1260 adjacent to the third distal pivot point 1252 of the distal closed linkage 1236. The fifth distal pivot point 1260 corresponds to a second pivot point that the bearing 1218 of the first linear actuator 1210 is coupled to the sealing module 1204.

The proximal bar linkage 1234 is symmetrically configured with respect to the distal bar linkage 1232. For example, the proximal bar linkage 1234 includes a proximal closed linkage 1262 adjacent to a proximal open linkage 1264. The proximal closed linkage 1262 is formed from four bar-shaped linkage members including a first proximal closed link 1266, a second proximal closed link 1268, a third proximal closed link 1270, and a fourth proximal closed link 1272. The first proximal closed link 1266, second proximal closed link 1268, third proximal closed link 1270, and fourth proximal closed link 1272 are pivotally coupled to form a closed area.

The first proximal closed link 1266 and the second proximal closed link 1268 are pivotally coupled at a first proximal pivot point 1274. The first proximal pivot point 1274 corresponds to a pivot point that the bearing 1218 of the second linear actuator 1212 of the second motor system 1208 is coupled to the sealing module 1204. The second proximal closed link 1268 and the third proximal closed link 1270 are pivotally coupled at a second proximal pivot point 1276. The third proximal closed link 1270 and the fourth proximal closed link 1272 are pivotally coupled at a third proximal pivot point 1278. The third proximal pivot point 1278 corresponds to a first pivot point that the bearing 1218 of the first linear actuator 1210 of the second motor system 1208 is coupled to the sealing module 1204. The first proximal closed link 1266 and the fourth proximal closed link 1272 are pivotally coupled at a fourth proximal pivot point 1280.

The proximal open linkage 1264 is constructed from two bar-shaped linkage members including a first proximal open link 1282 and a second proximal open link 1284. The first proximal open link 1282 and the second proximal open link 1284 are pivotally coupled at a fifth proximal pivot point 1286 that is adjacent to the third proximal pivot point 1278 of the proximal closed linkage 1262. The fifth proximal pivot point 1286 corresponds to a second pivot point that the bearing 1218 of the first linear actuator 1210 of the second motor system 1208 is coupled to the sealing module 1204.

The example sealing module 1204 additionally includes a first distal sealing bar mount 1288, a second distal sealing bar mount 1290, a first proximal sealing bar mount 1292, a second proximal sealing bar mount 1294, a first sealing bar 1296, and a second sealing bar 1298.

The first distal sealing bar mount 1288 is coupled to the distal bar linkage 1232 at the fourth distal pivot point 1254 of the distal closed linkage 1236, and at a sixth distal pivot point 1300 of the distal open linkage 1238. The second distal sealing bar mount 1290 is coupled to the distal bar linkage 1232 at the second distal pivot point 1250 of the distal closed linkage 1236, and at a seventh distal pivot point 1302 of the distal open linkage 1238.

The first and second proximal sealing bar mounts 1292, 1294 are symmetrically configured with respect to the first and second distal sealing bar mounts 1288, 1290. For example, the first proximal sealing bar mount 1292 is coupled to the proximal bar linkage 1234 at the fourth proximal pivot point 1280 of the proximal closed linkage 1262, and at a sixth proximal pivot point 1304 of the proximal open linkage 1264. The second proximal sealing bar mount 1294 is coupled to the proximal bar linkage 1234 at the second proximal pivot point 1276 of the proximal closed linkage 1262, and at a seventh proximal pivot point 1306 of the proximal open linkage 1264.

In example embodiments, the first distal sealing bar mount 1288 and the first proximal sealing bar mount 1292 are each constructed to include a first flexible bend 1308 and a second flexible bend 1310. Similarly, the second distal sealing bar mount 1290 and the second proximal sealing bar mount 1294 are each constructed to include a flexible bend 1312. In this manner, each respective mount 1288, 1290, 1292, 1294 are constructed to include a force compliance mechanism that equally distributes a sealing pressure imparted on a travelling packaging film during a dwell type sealing process.

As mentioned above, the sealing module 1204 additionally includes a first sealing bar 1296 and a second sealing bar 1298. In example embodiments, the first sealing bar 1296 includes a first sealing bar distal end 1314 and a first sealing bar proximal end 1316. The first sealing bar distal end 1314 is coupled to a first distal sealing bar end portion 1318 of the first distal sealing bar mount 1288, and the first sealing bar proximal end 1316 is coupled to a first proximal sealing bar end portion 1320 of the first proximal sealing bar mount 1292. In this manner, the first sealing bar 1296 is coupled between the first distal sealing bar mount 1288 and the first proximal sealing bar mount 1292.

Similarly, the second sealing bar 1298 includes a second sealing bar distal end 1322 and a second sealing bar proximal end 1324. The second sealing bar distal end 1322 of the second sealing bar 1298 is coupled to a second distal sealing bar end portion 1326 of the second distal sealing bar mount 1290, and the second sealing bar proximal end 1324 of the second sealing bar 1298 is coupled to a second proximal sealing bar end portion 1328 of the second proximal sealing bar mount 1294. As such, the second sealing bar 1298 is coupled between second distal sealing bar mount 1290 and second proximal sealing bar mount 1294.

In general, any of a plurality of materials and methods of manufacture may be used to form linkage members of the example apparatus 1200. Example materials include aluminum, sheet metal, and others. Examples methods of manufacture includes stamping, laser cutting, casting, and others.

Operational aspects of the example apparatus 1200 are now described according to the principles of the present disclosure.

Operation of the example apparatus 1200 comprises independently controlling a position and/or displacement of the first and second linear actuators 1210, 1212 of the first and second motor systems 1206, 1208 along the respective shaft assembly 1214. The motion of the respective first and second linear actuators 1210, 1212 in turn corresponds to a motion profile of the sealing module 1204 comprising vertical and lateral displacement of the first and second sealing bars 1296, 1298 during a dwell type sealing operation.

With the configuration of the actuator module 1202 and sealing module 1204 as described above, the motion of the first and second linear actuators 1210, 1212 of the first motor system 1206 is symmetric with respect to the motion of the first and second linear actuators 1210, 1212 of the second motor system 1208 during operation of the example apparatus 1200. Accordingly, the vertical and lateral displacement of the first and second sealing bars 1296, 1298 during a dwell type sealing operation are now described in terms of motion of the first and second linear actuators 1210, 1212 of the first motor system 1206 along the respective shaft assembly 1214.

In example embodiments, adjustment of a relative distance between the first and second linear actuators 1210, 1212 on the shaft assembly 1214 is used to control a vertical separation of the first and second sealing bars 1296, 1298 throughout a dwell type sealing operation. Similar to that described above, a dwell type sealing operation generally includes engaging the first and second sealing bars 1296, 1298 to a travelling packing film at a start position, maintaining engagement of the first and second sealing bars 1296, 1298 over a sealing distance to achieve a seal, and returning the first and second sealing bars 1296, 1298 to the start position.

Figure 12:
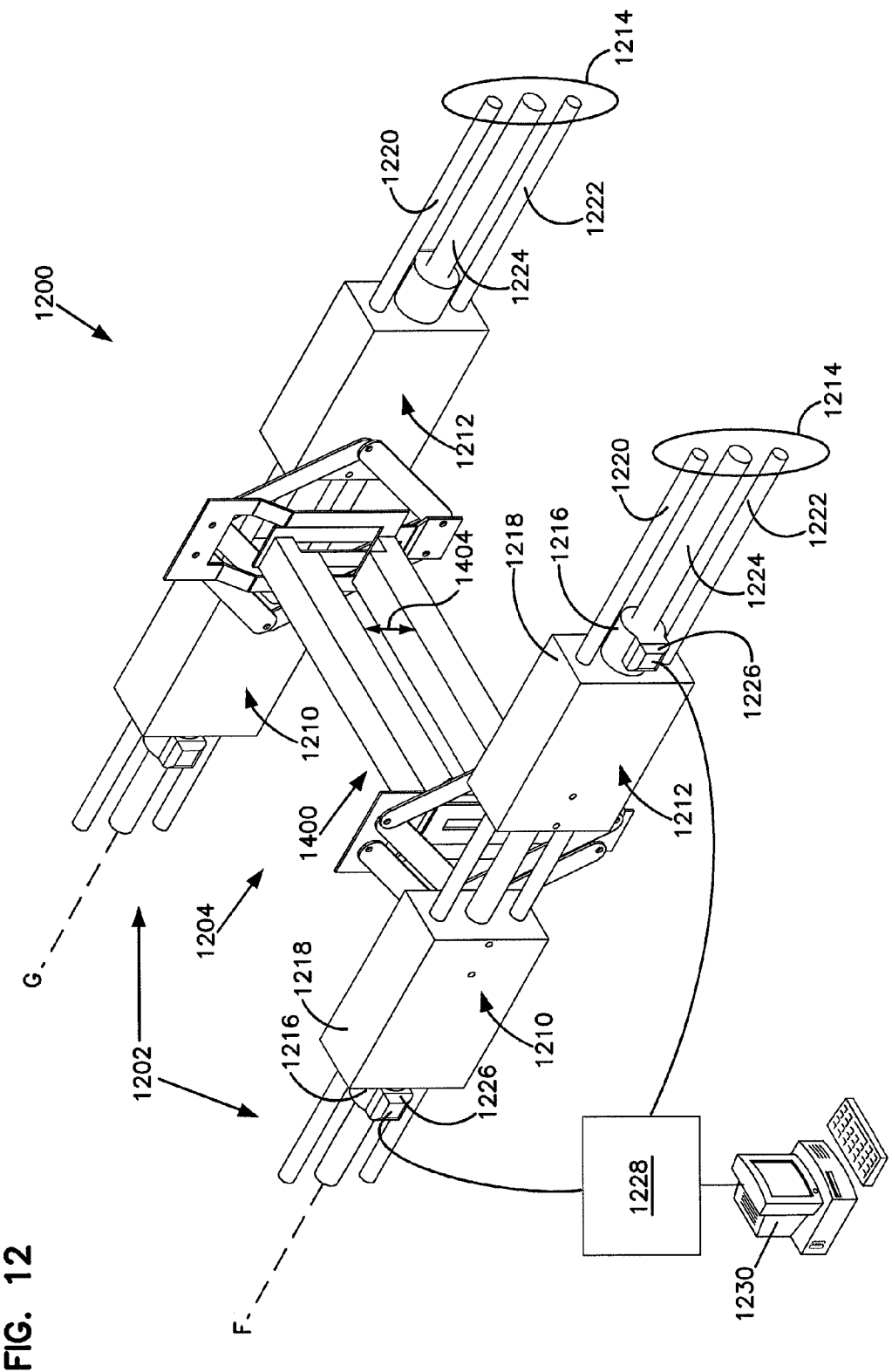
FIG. 12 is a perspective view of another example sealing apparatus shown with sealing bars in a partially disengaged position.
Figure 13:
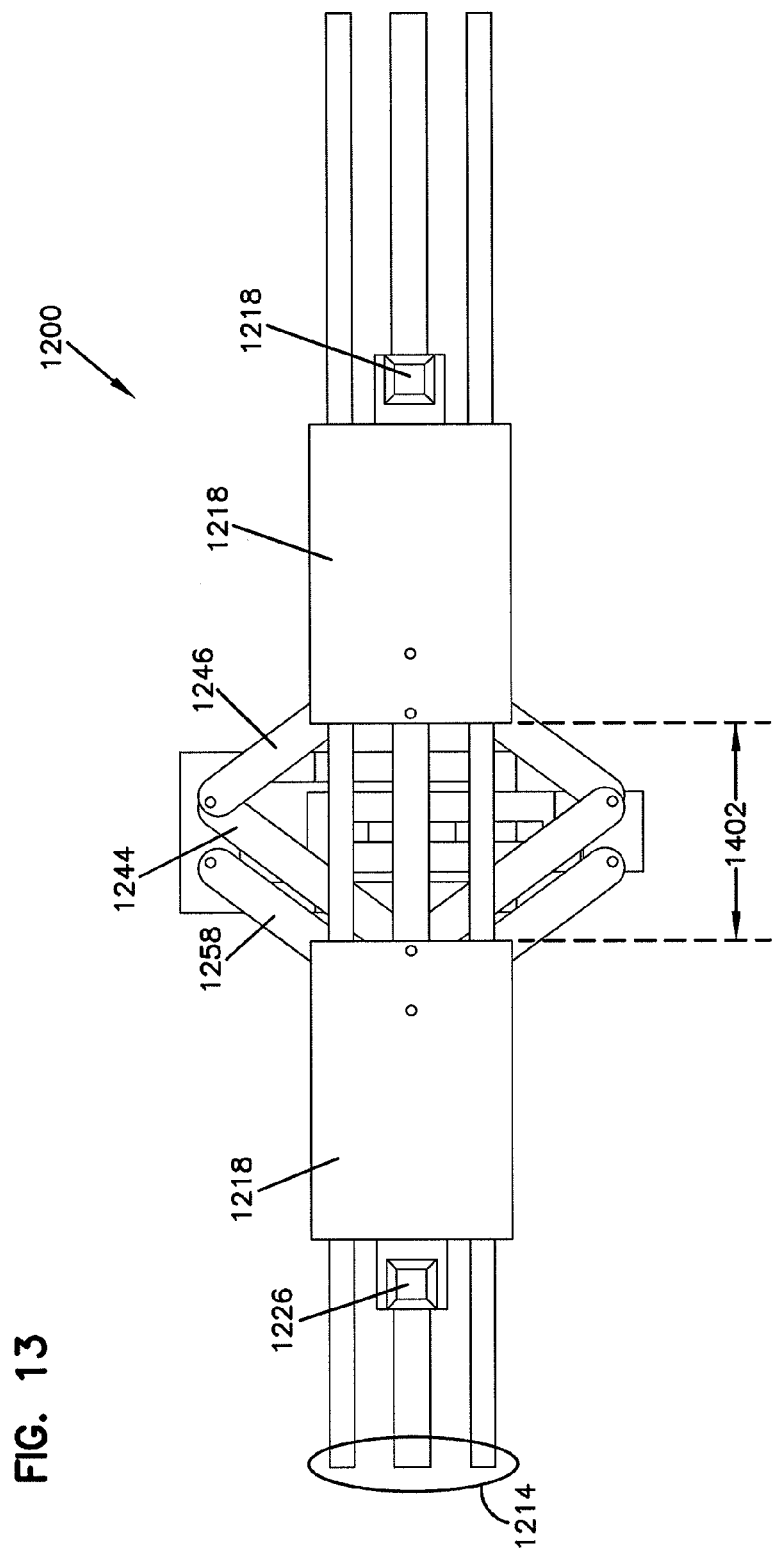
FIG. 13 is a side view of the example sealing apparatus shown in FIG. 12.
Figure 14:
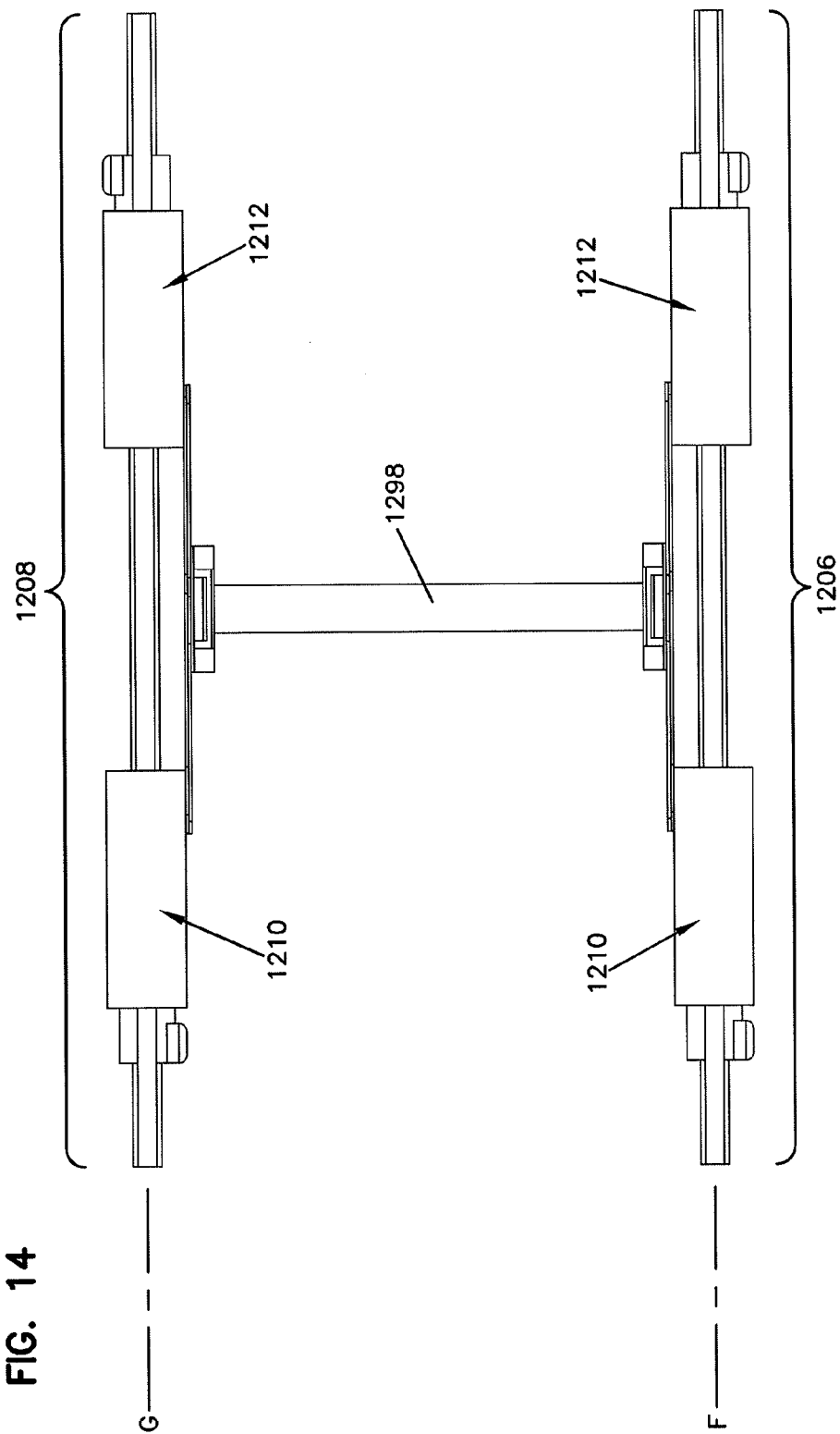
FIG. 14 is a top view of the example sealing apparatus shown in FIG. 12.

Referring now to FIGS. 12-14, the first and second sealing bars 1296, 1298 are shown in a partial disengaged position 1400. In the example shown, the relative position of the first and second linear actuators 1210, 1212 are independently adjusted such that the first and second sealing bars 1296, 1298 are actuated to a distance 1402 relative to one another. In the example embodiment, distance 1402 corresponds to a vertical separation 1404 between the first and second sealing bars 1296, 1298.

Figure 15:
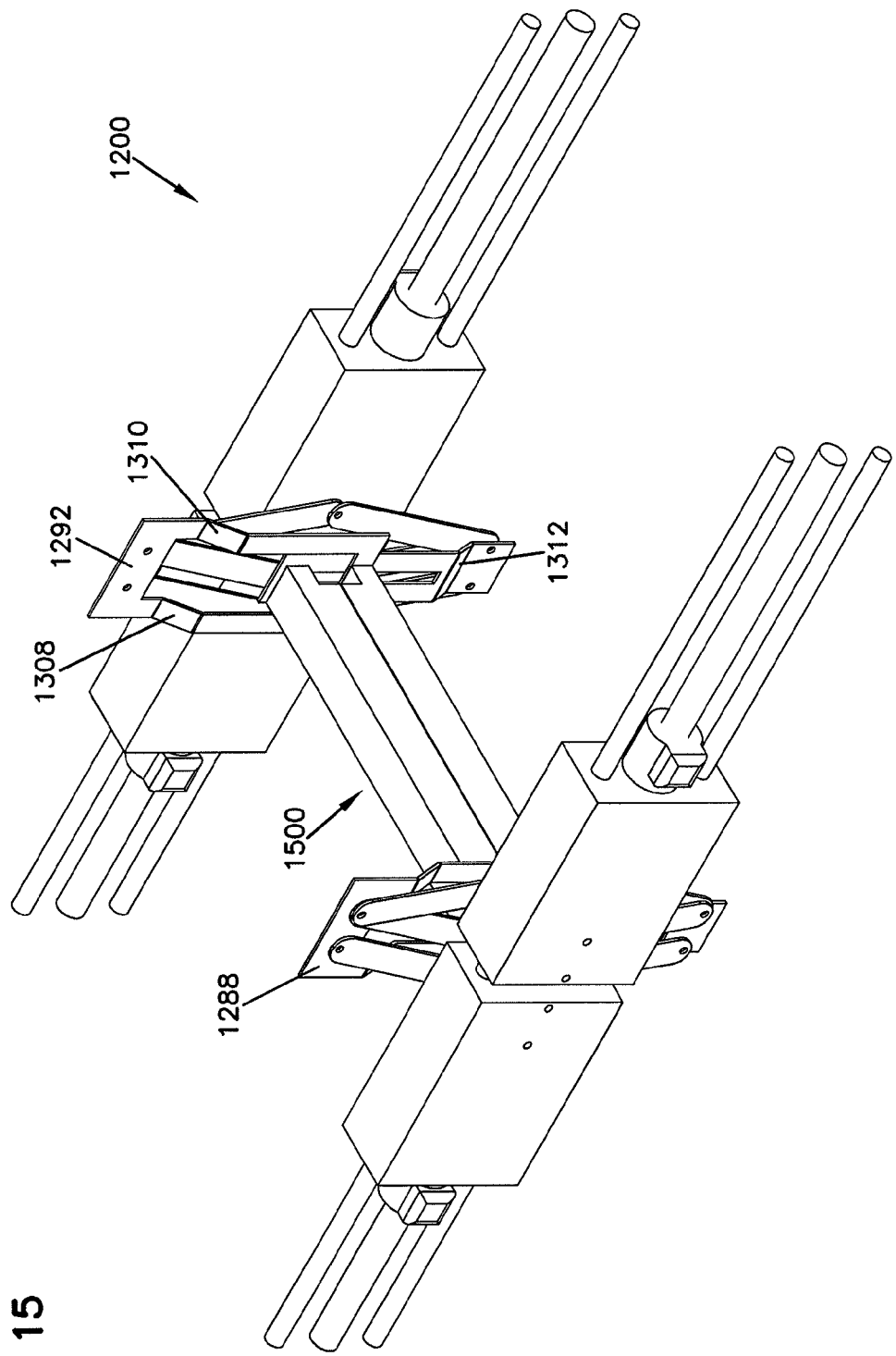
FIG. 15 is a perspective view of the example sealing apparatus of FIG. 12 shown with sealing bars shown in an engaged position.
Figure 16:
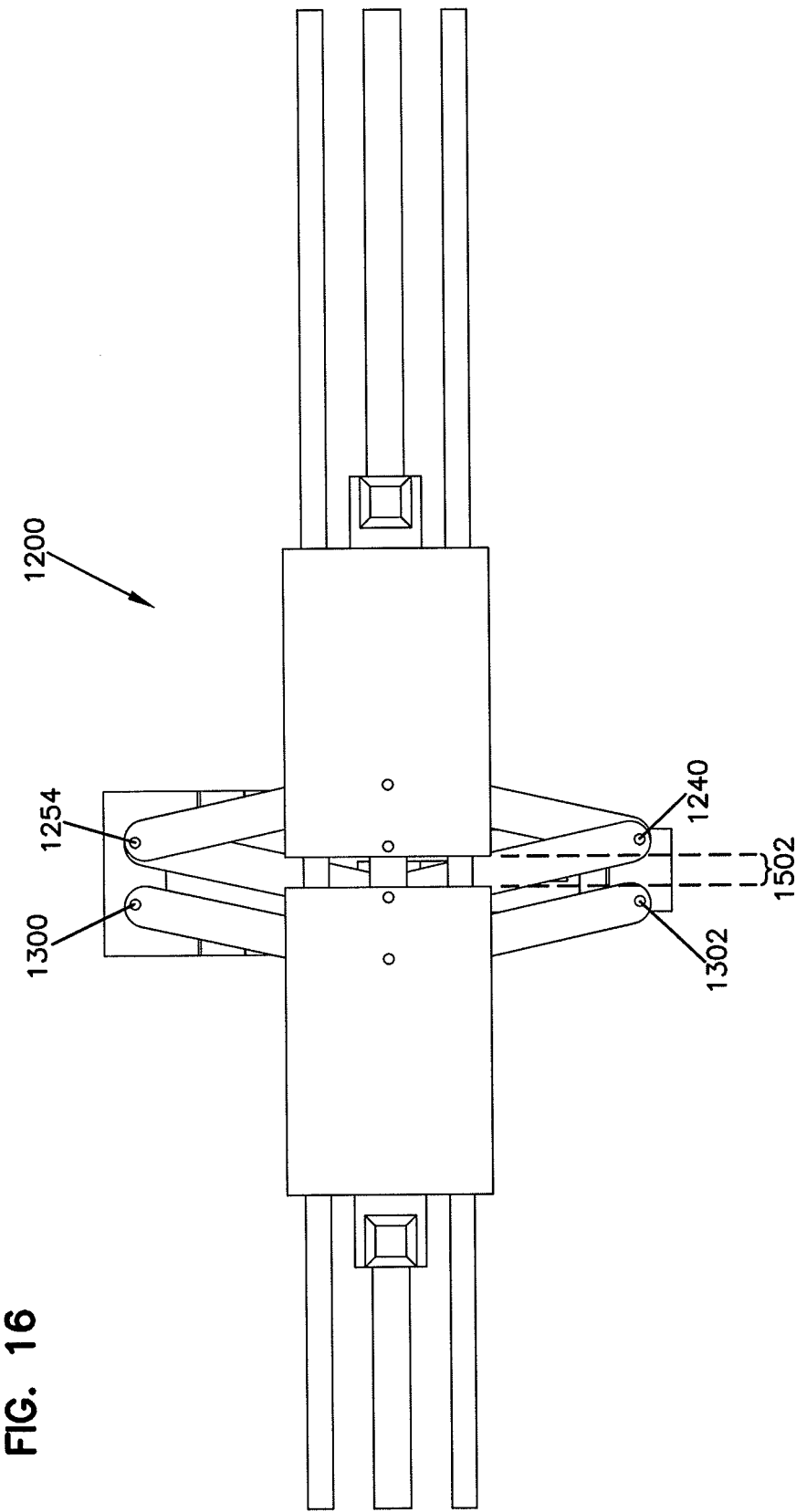
FIG. 16 is a side view of the example sealing apparatus shown in FIG. 12.

Referring now to FIGS. 15 and 16, the first and second sealing bars 1296, 1298 are shown in an engaged position 1500. In the example shown, the relative position of the first and second linear actuators 1210, 1212 are independently adjusted such that the first and second sealing bars 1296, 1298 are actuated to a distance 1502 relative to one another. In the example embodiment, the first and second sealing bars 1296, 1298 are in contact with each other. In the engaged position 1500, a force imparted on a packaging film by the first sealing bar 1296 is approximately equal to a force imparted on a packaging film by the second sealing bar 1298.

Figure 17:
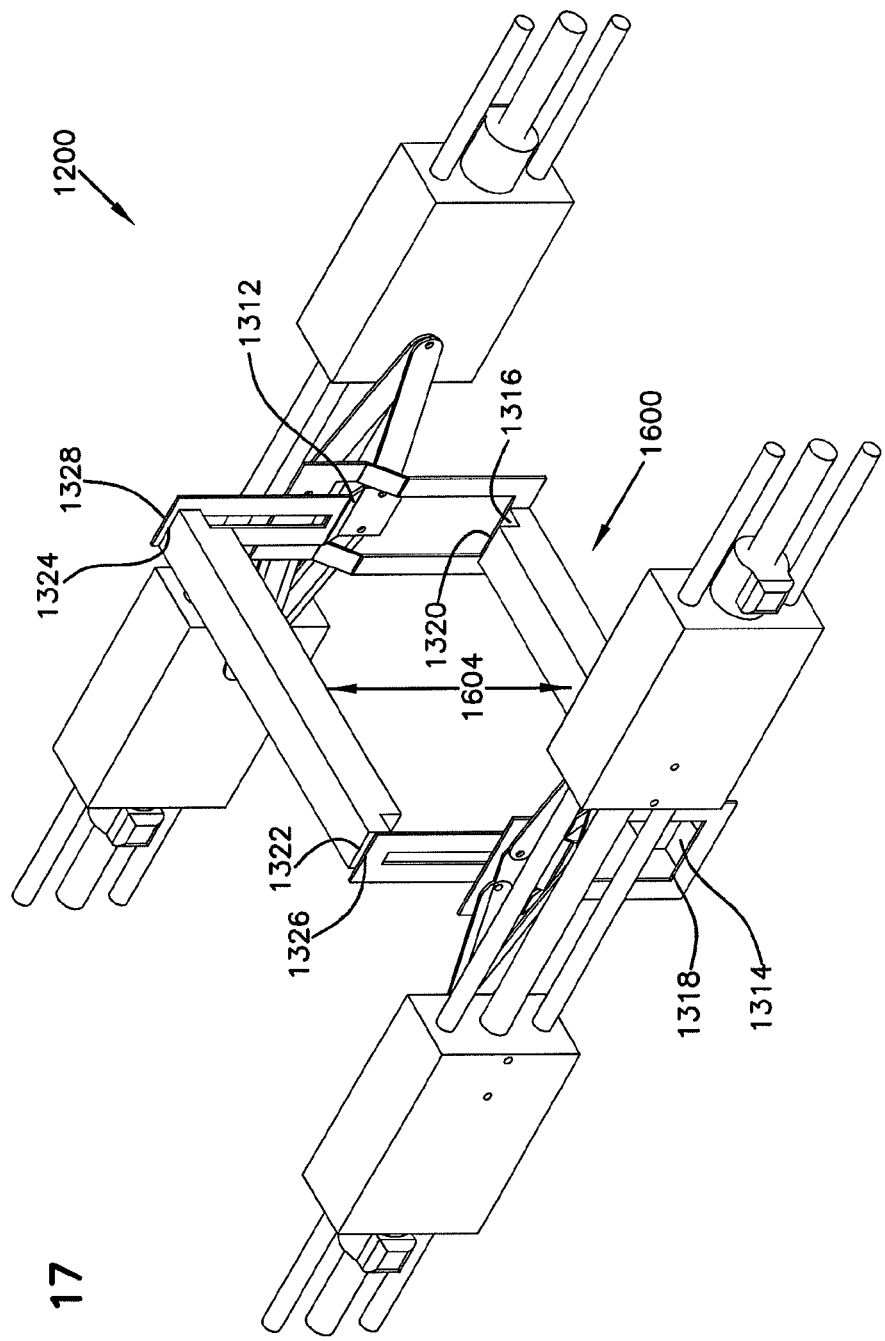
FIG. 17 is a perspective view of the example sealing apparatus of FIG. 12 shown with sealing bars in a fully disengaged position.
Figure 18:
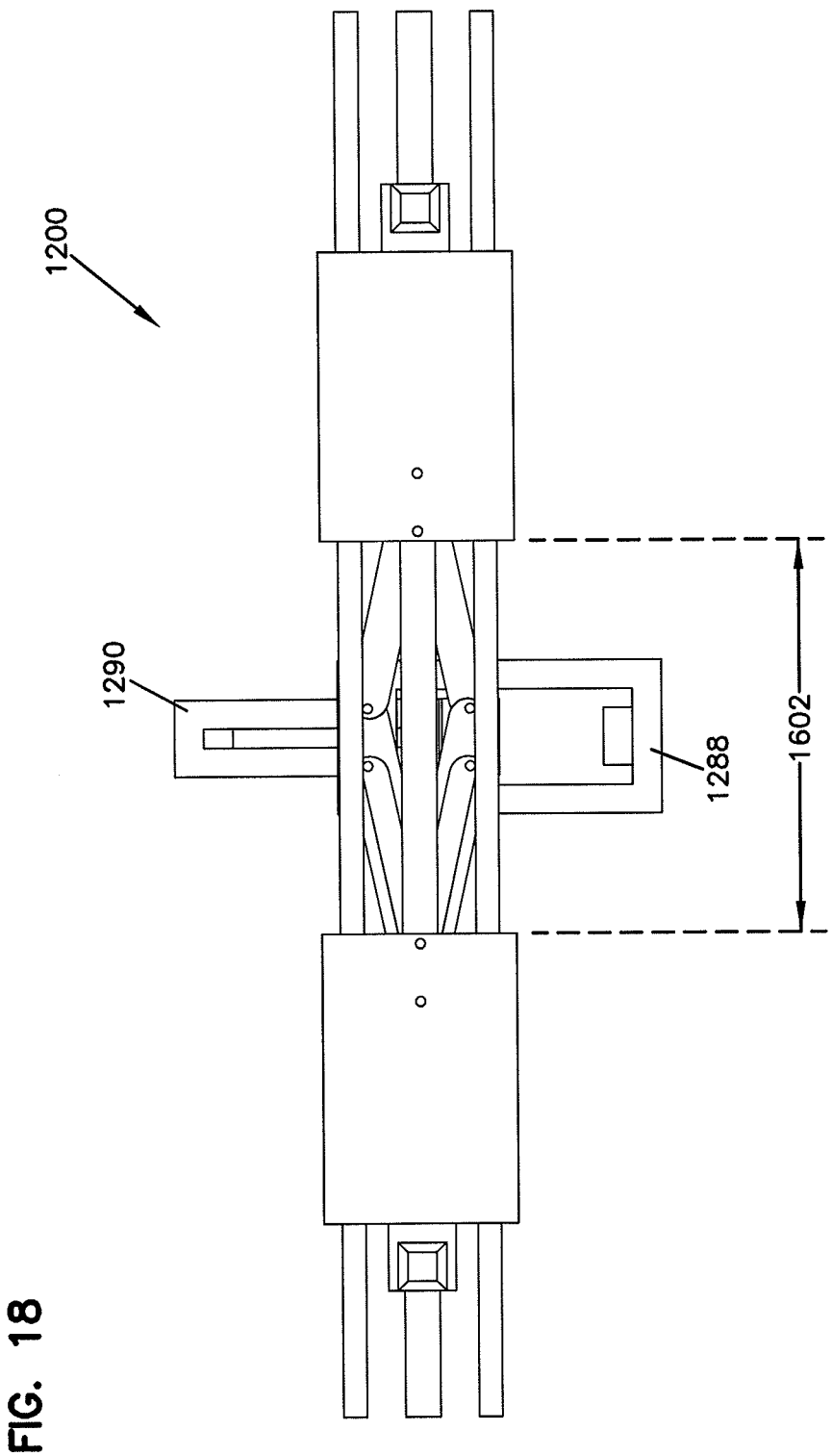
FIG. 18 is a side view of the example sealing apparatus shown in FIG. 17.
Figure 19:
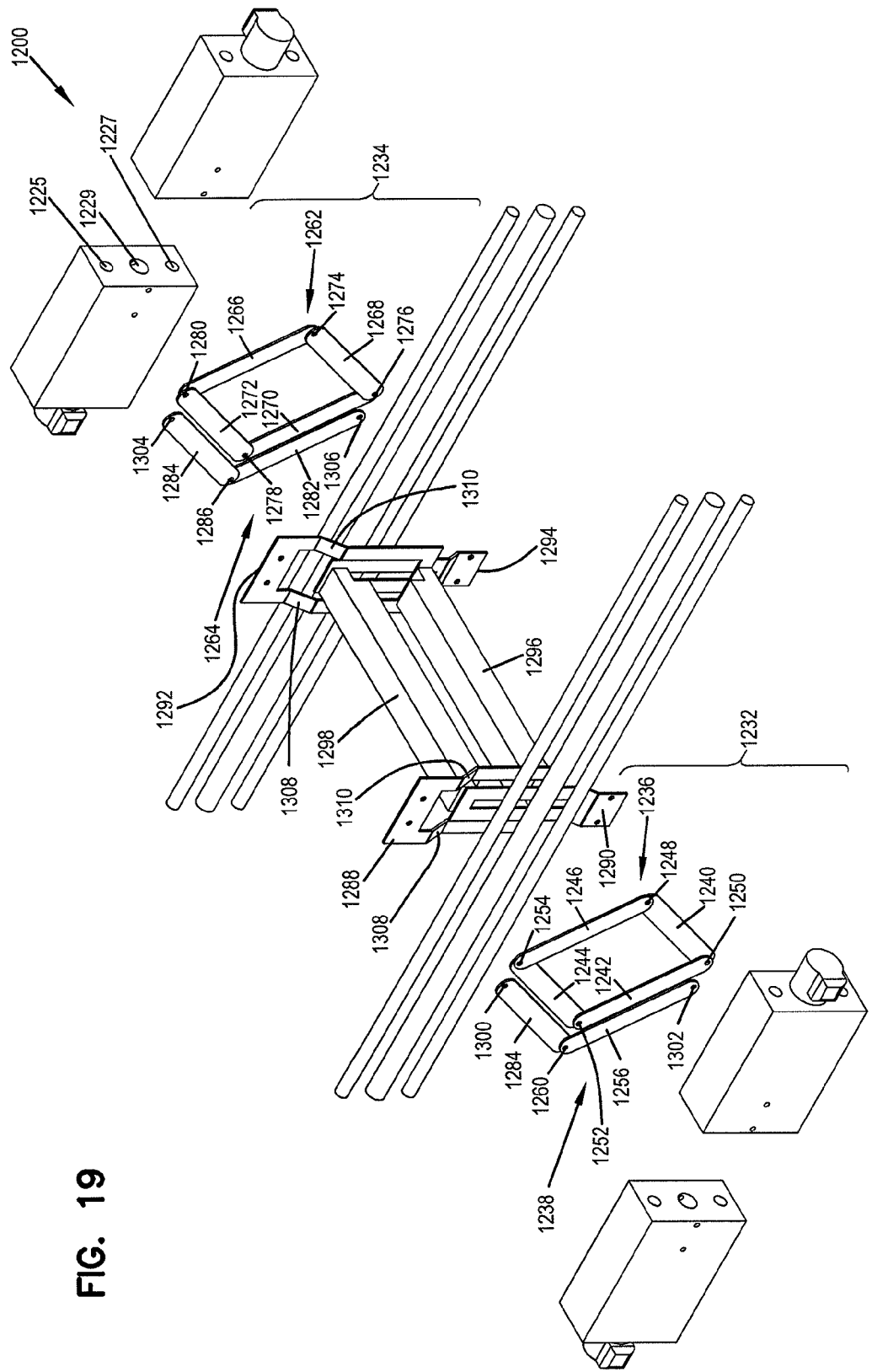
FIG. 19 is an exploded perspective view of the example sealing apparatus shown in FIG. 12.

Referring now to FIGS. 17 and 18, the first and second sealing bars 1296, 1298 are shown in a fully disengaged position 1600. In the example shown, the relative position of the first and second linear actuators 1210, 1212 are independently adjusted such that the first and second sealing bars 1296, 1298 are actuated to a distance 1602 relative to one another. In the example embodiment, distance 1602 corresponds to a vertical separation 1604 between the first and second sealing bars 1296, 1298.

The relative distance between the first and second linear actuators 1210, 1212 on the shaft assembly 1214 is an adjustable parameter that may be defined throughout a dwell type sealing operation. Adjustment of the first and second linear actuators 1210, 1212 includes independently applying a signal to the respective coil 1216 from the controller 1228 to control the magnetic interaction between the coil 1216 and the magnetized slide shaft 1224 consistent with the principle of operation of example linear motors. Other example adjustable parameters include a dwell time, a dwell pressure, a sealing temperature, and other dwell type sealing process parameters.

Additionally, the coil 1216 of each respective bearing 1218 is configured to transmit feedback information to the controller 1228 via the input 1226. In example embodiments, the feedback specifies an actual position of the first and second linear actuators 1210, 1212 of each of the first and second motor systems 1206, 1208 along the respective shaft assembly 1214 consistent with the principle of operation of example linear motors.

Adjustment of absolute position of the first and second linear actuators 1210, 1212 on the shaft assembly 1214 while maintaining a relative distance therebetween is used to control a lateral displacement of the first and second sealing bars 1296, 1298 throughout a dwell type sealing operation. In example embodiments, this coordinated adjustment is analogous to adjustment the first and second distal bearings 186, 190 as described above with respect to FIGS. 9-11. In this manner, the first and second sealing bars 1296, 1298 can be actuated to a start position, intermediate position, and end position, and any other positions desired for of a dwell type sealing operation.

Portions of the example embodiments described herein can be implemented as logical operations in a computing device in a networked computing system environment. The logical operations can be implemented at least as: a sequence of computer implemented instructions, steps, or program modules running on a computing device; and interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A sealing apparatus for sealing a travelling packaging film, comprising:
   a first actuator and a second actuator;
   a first seal member and a second seal member;
   a slide rail arrangement; and
   a linkage coupled to the slide rail arrangement and connecting each of the first and second actuators to the first and second seal members;
   wherein the first and second seal members are actuated toward and away from each other between a disengaged position and an engaged position for sealing the travelling packaging film;
   wherein the first actuator comprises a first shaft and the second actuator comprises a second shaft aligned parallel to the first shaft; and
   wherein an angular position of each of the first and second shafts are independently controlled.

2. The sealing apparatus of claim 1, wherein the linkage comprises two symmetrical linkage arrangements each constructed from a plurality of pivotally coupled linkage members, wherein the first and second seal members have opposite ends, and wherein a portion of each of the symmetrical linkage arrangements is mounted to each opposite end of the first and second seal members.

3. The sealing apparatus of claim 1, wherein the slide rail arrangement comprises:
   a distal rail having a first distal bearing and a second distal bearing coupled thereto; and
   a proximal rail parallel to the distal rail having a first proximal bearing and a second proximal bearing coupled thereto;
   wherein the distal rail and the proximal rail are parallel to one another and are positioned in a cross-direction to a longitudinal axis of the first and second shafts.

4. The sealing apparatus of claim 2, further comprising:
   a controller coupled to each of the first and second actuators; and
   a computing device coupled to the controller;
   wherein the computing device is configured to receive a plurality of motion profile parameters corresponding to a motion profile of the first and second seal members.

5. A sealing apparatus adapted for sealing a travelling packaging film that is sealed while traveling along a traveling direction, the sealing apparatus comprising:
   a first rotary actuator and a second rotary actuator, an angular position of each of the first and second rotary actuators independently controlled from each other;
   a linkage driven by both the first and second rotary actuators; and
   a first seal member and a second seal member actuated toward and away from each other by the first and second rotary actuators via the linkage, the first and second seal members actuated between a disengaged configuration and an engaged configuration for sealing the travelling packaging film, and the first and second seal members actuated along the traveling direction and opposite the traveling direction by the first and second rotary actuators;
   wherein the first and second seal members are actuated toward each other when the first and second rotary actuators are driven with a first set of move profiles; and
   wherein the first and second seal members are actuated away from each other when the first and second rotary actuators are driven with a second set of move profiles.

6. The sealing apparatus of claim 5, further comprising a slide rail arrangement coupled to the linkage, wherein the first rotary actuator comprises a first shaft and the second rotary actuator comprises a second shaft aligned parallel to the first shaft.

* * * * *